(12) United States Patent
Habib et al.

(10) Patent No.: US 12,051,143 B2
(45) Date of Patent: Jul. 30, 2024

(54) DYNAMIC PATH ANIMATION OF ANIMATION LAYERS AND DIGITAL DESIGN OBJECTS

(71) Applicant: Adobe Inc., San Jose, CA (US)

(72) Inventors: Kazi Rubaiat Habib, Seattle, WA (US); Timothy Langlois, Seattle, WA (US); Li-Yi Wei, Redwood City, CA (US); John Simpson, Dublin, CA (US); James Corbett, Berkeley, CA (US); Christopher Nuuja, San Anselmo, CA (US); Brooke Hopper, Berkeley, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/653,090

(22) Filed: Mar. 1, 2022

(65) Prior Publication Data
US 2023/0281903 A1  Sep. 7, 2023

(51) Int. Cl.
*G06T 13/80* (2011.01)
*G06F 3/04845* (2022.01)
(Continued)

(52) U.S. Cl.
CPC .......... *G06T 13/80* (2013.01); *G06F 3/04845* (2013.01); *G06F 3/04847* (2013.01); *G06T 11/60* (2013.01); *G06T 2200/24* (2013.01)

(58) Field of Classification Search
CPC ..... G06T 13/80; G06T 11/60; G06T 2200/24; G06F 3/04845; G06F 3/04847
See application file for complete search history.

(56) References Cited

U.S. PATENT DOCUMENTS 6,686,918 B1   2/2004 Cajolet et al.
8,701,007 B2   4/2014 Meaney et al.
(Continued)

OTHER PUBLICATIONS

Meier (Meier, Barbara J., "Painterly rendering for animation", Siggraph '96: Proceedings of the 23rd annual conference on Computer graphics and interactive techniques, Aug. 1996, pp. 477-484) (Year: 1996).*

(Continued)

*Primary Examiner* — William A Beutel
(74) *Attorney, Agent, or Firm* — Keller Preece PLLC

(57) ABSTRACT

The present disclosure relates to systems, non-transitory computer-readable media, and methods for generating and modifying digital animations based on user interactions with a unique user interface portraying a one-dimensional layer motion element and/or elements for generating and utilizing animation path for digital design objects and animation layers. The disclosed system can provide a dynamic one-dimensional layer motion element that adapts to a selected animation layer and portrays selectable animation frames from the animation layer. The disclosed systems can provide options for generating and modifying various frames of the digital animation based on user interactions with the one-dimensional layer motion element, an animation timeline, and/or a corresponding animation canvas. Additionally, in some embodiments, the disclosed systems also generate path animations with complex animation effects based on user selection of animation paths, digital design objects of animation layers, and corresponding selectable path animation feature tools.

20 Claims, 21 Drawing Sheets

(51) Int. Cl.
*G06F 3/04847* (2022.01)
*G06T 11/60* (2006.01)

(56) References Cited

U.S. PATENT DOCUMENTS

| | | |
|---|---|---|
| 10,042,516 B2 | 8/2018 | Day |
| 10,734,028 B2 | 8/2020 | Fay |
| 2006/0055700 A1* | 3/2006 | Niles ................ G06T 13/20 |
| | | 345/473 |
| 2012/0013621 A1 | 1/2012 | Ospina Gonzalez |
| 2012/0308210 A1 | 12/2012 | Ubillos |
| 2013/0124990 A1 | 5/2013 | Lettau |
| 2015/0286376 A1 | 10/2015 | Tijssen |
| 2018/0276870 A1* | 9/2018 | Redkey ................ G06T 17/20 |
| 2020/0302671 A1* | 9/2020 | Poling ................ G06F 3/04883 |

OTHER PUBLICATIONS

YouTube; Adobe Animate | How to move an object along the motion path; Apr. 8, 2019; https://www.youtube.com/watch?v=iwuaXIRfevs.

"Getting Around Flash—Flash CS6: The Missing Manual", Glover, Chris. Jun. 2012. O'Reilly Media, Inc. ISBN: 9781449316259. Accessed via the web at https://www.oreilly.com/library/view/flash-cs6-th/9781443330453/ch01.html.

U.S. Appl. No. 17/653,094, filed Aug. 16, 2023, Office Action.
U.S. Appl. No. 17/653,094, Jan. 12, 2024, Notice of Allowance.

\* cited by examiner

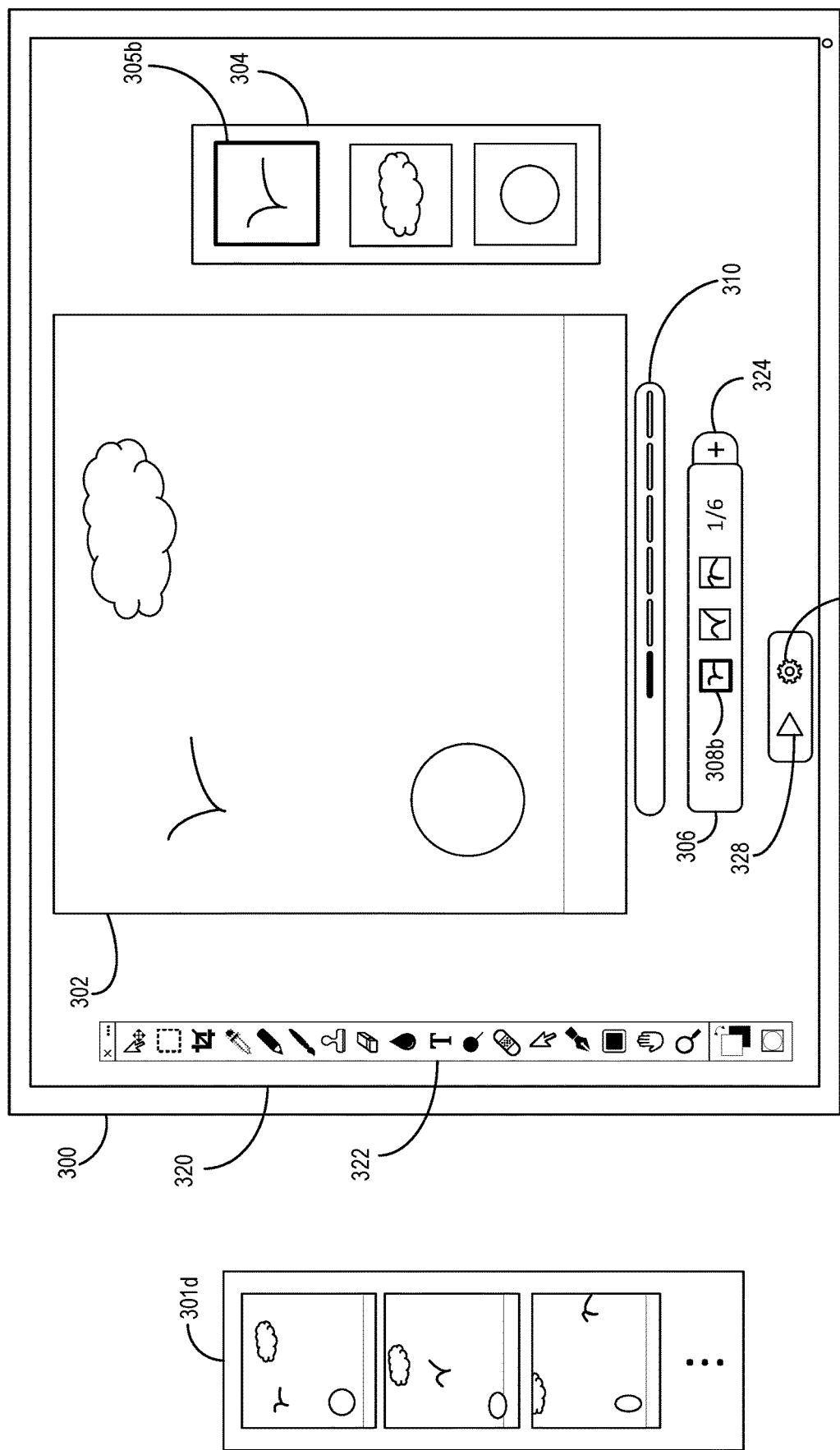

DYNAMIC PATH ANIMATION OF ANIMATION LAYERS AND DIGITAL DESIGN OBJECTS

BACKGROUND

Recent years have seen significant development in hardware and software platforms for generating and editing digital animations. In particular, many conventional systems generate digital animations based on user interactions with a variety of different user interfaces and interface elements at a client device. More specifically, many conventional digital animation systems provide user interfaces with a large number of editable digital animation sequence channels for modifying and displaying digital animations. For example, some conventional systems modify digital animations by implementing modifications at a variety of different animation channels arrayed in a two-dimensional grid, where each channel displays a variety of different animation frames. Despite these advances, conventional digital animation systems continue to suffer from a number of disadvantages, particularly in efficiency and flexibility of implementing computer devices.

BRIEF SUMMARY

Embodiments of the present disclosure provide benefits and/or solve one or more of the foregoing or other problems in the art with systems, non-transitory computer-readable media, and methods that generate and modify digital animations utilizing a unique user interface that includes a dynamic one-dimensional layer motion element. For example, the disclosed systems provide a user interface that includes a one-dimensional layer motion element that illustrates digital frames corresponding to a selected animation layer. In one or more implementations, the disclosed systems also provide an animation timeline within the user interface with the one-dimensional layer motion element. This animation timeline illustrates global frame representations for efficient orientation and movement within the digital animations in conjunction with the one-dimensional layer motion element. Based on user interactions with the one-dimensional layer motion element, a motion animation canvas, and/or the document timeline, the disclosed systems can generate and modify digital animations more efficiently and flexibly. For instance, the disclosed systems can significantly reduce the number of user interface elements while making efficient modifications to layers and frames of a digital animation via a digital animation canvas.

Additionally, in one or more embodiments, the disclosed systems generate digital animations based on animation paths provided via the digital animation canvas. More specifically, in one or more embodiments, the disclosed systems receive user interactions indicating a line, curve, or shape within an animation canvas corresponding to a digital design object. In response, the disclosed systems generate a set of animation frames that portray the digital design object moving according to the line, curve, or shape (i.e., the animation path). In one or more embodiments, the disclosed systems provide a variety of additional animation features along animation paths, including multi-path animation, multiple object instance animation along an animation path, animation frame cycling while moving an animation source along an animation path, variable speed animation along an animation path, object scatter offsets along an animation path, randomized or oscillated movement around an animation path, and/or object orientation alignment to an animation path. Thus, the disclosed systems can efficiently generate and modify animation frames of digital animations based on generation of an animation path.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

FIGS. 3A-3F illustrate an example graphical user interface including a one-dimensional layer motion interface and various user interactions in accordance with one or more embodiments.

DETAILED DESCRIPTION

Figure 1:
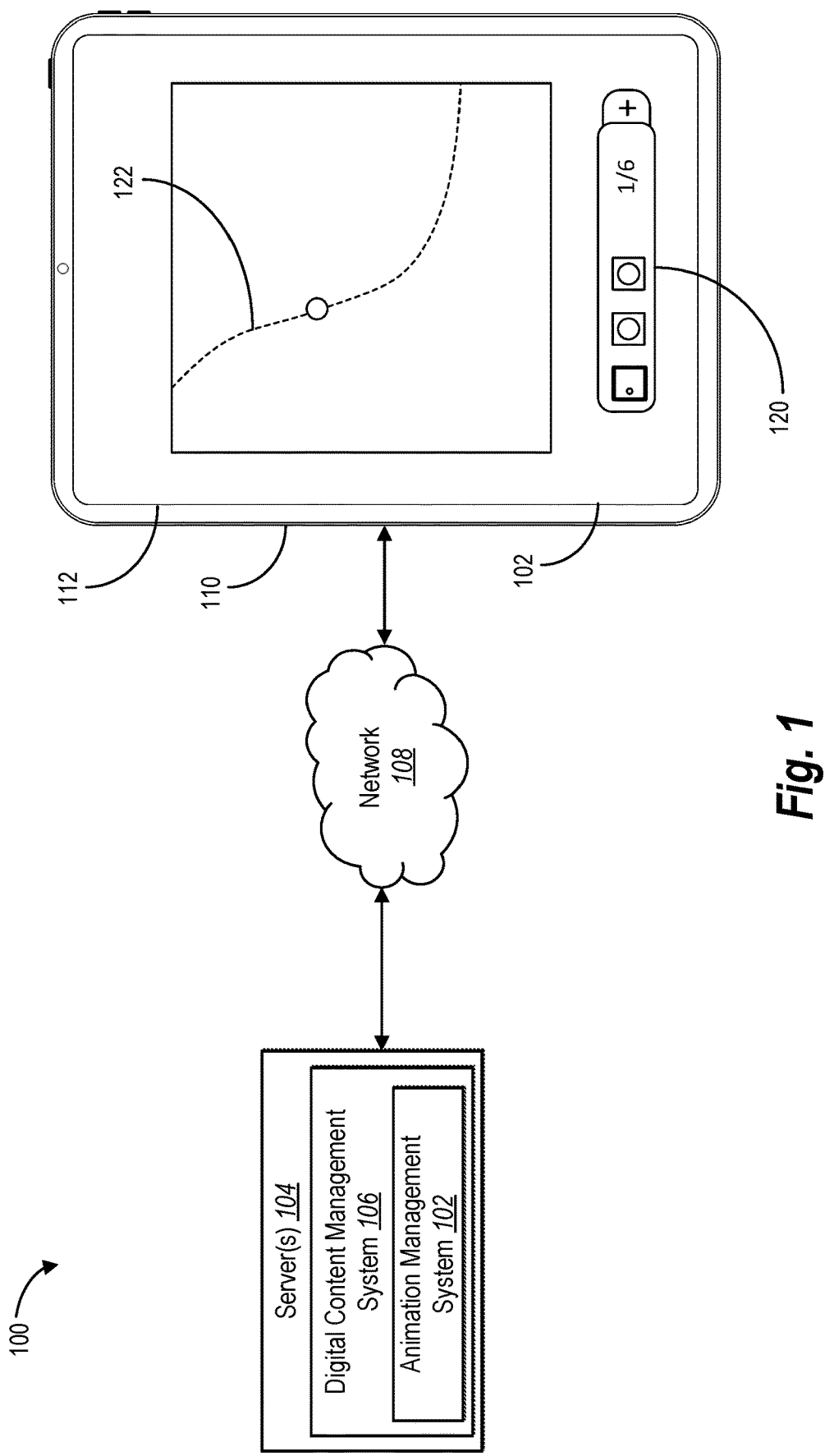
FIG. 1 illustrates a diagram of an environment in which an animation management system operates in accordance with one or more embodiments.

This disclosure describes one or more embodiments of an animation management system that efficiently and flexibly generates and modifies digital animations utilizing a dynamic one-dimensional layer motion element that includes animation frames corresponding to a selected animation layer. More specifically, the animation management system utilizes the one-dimensional layer motion element to provide a selected animation frame and animation layer in an animation canvas to generate and/or modify digital design objects within a digital animation. Moreover, in one or more embodiments, the animation management system also provides an animation timeline in conjunction with the one-dimensional layer motion element to efficiently navigate within frames and layers in generating digital animations. To illustrate, the animation management system receives a selection of an animation layer (from a set of animation layer tiles) and populates the one-dimensional layer motion element with frames corresponding to the selected layer. The animation management system navigates through frames of the selected layer based on user interactions with the one-dimensional layer motion element and/or the animation timeline, which reflects the current frame relative to global frames of the digital animation. Moreover, in response to user interactions with a digital animation canvas, the animation management system modifies frames of the selected layer to efficiently and flexibly generate and display a modified digital animation.

Additionally, in one or more embodiments, the animation management system animates digital design objects along animation paths in one or more animation layers. For example, the animation management system identifies a digital design object corresponding to a frame of a particular layer and also receives user interactions indicating a line and/or curve defining an animation path. In response, the animation management system automatically generates a digital animation moving the digital design object along the animation path. Moreover, the animation management system provides a variety of animation features to quickly and efficiently implement complex path animation effects. For example, the animation management system provides selectable options for particle animation along the animation path, multiple particle instances along an animation path, random animation around the animation path, path orientation alignment of objects to the animation path, path velocity modification along the animation path, scatter animation around the animation path, and/or multiple animation paths. Utilizing one or more of these features, the animation management system generates complex animation effects, such as falling rain, blowing dust or leaves, or a flock of birds with a small number of user interactions.

As mentioned, in one or more embodiments, the animation management system provides a graphical user interface including an animation canvas. In some embodiments, the animation canvas includes an interactive surface for drawing, selecting, modifying, or generating digital animations. In one or more embodiments, the animation management system includes selectable options to modify frames and animation layers portrayed via the animation canvas. Thus, for example, the animation management system provides all animation layers for display via the animation canvas or a single animation layer for display via the animation canvas.

In one or more embodiments, the animation management system provides a graphical user interface that includes the animation canvas and a set of animation layer tiles corresponding to different layers of a digital animation. Indeed, the animation management system generates and manages a variety of different layers corresponding to different digital design objects of a digital animation. For example, the animation management system generates a first layer for a first set of frames illustrating a first set of digital design object and a second layer for a second set of frames illustrating a second digital design object. The animation management system provides a first animation tile for the first layer and a second animation tile for the second layer.

As also mentioned, in one or more embodiments, the animation management system provides a graphical user interface that includes a one-dimensional layer motion element. The animation management system utilizes the one-dimensional layer motion element to dynamically illustrate and manipulate frames for different layers of the digital animation. For example, in response to selection of a first animation layer tile, the animation management system populates the one-dimensional layer motion element with a first set of frames portraying a first set of digital design objects corresponding to a first layer. Similarly, in response to selection of a second animation layer tile, the animation management system populates the one-dimensional layer motion element with a second set of frames portraying a second set of digital design objects corresponding to the second layer. Thus, by utilizing the one-dimensional layer motion element, the animation management system provides for flexible editing and manipulation of individual layers and frames without over-populating the user interface with excessive user interface elements.

As discussed above, in some implementations the animation management system also generates a user interface that includes an animation timeline for more efficient manipulation of frames within a digital animation. For example, the animation management system generates an animation timeline that includes a current frame representation and global frame representations. Based on user interaction with the animation timeline, the animation management system moves the one-dimensional layer motion element and/or the digital canvas to a frame of the digital animation. Moreover, as a client device cycles through different frames (via the one-dimensional layer motion element) the animation timeline illustrates the current frame relative to the overall digital animation (including other frames corresponding to other layers in the digital animation). Thus, because the one-dimensional layer motion element illustrates frames of a particular selected layer, in some implementations the animation management system utilizes the animation timeline to navigate and orient clients within a digital animation.

Accordingly, based on user interaction with the animation canvas, the animation layer tiles, the one-dimensional layer motion element, and/or the animation timeline, the animation management system generates digital animations. For example, the animation management system receives a selection of a first animation layer tile and provides a set of frames corresponding to a first layer for display via the one-dimensional layer motion element. In response to user interaction with the one-dimensional layer motion element, the animation management system adds frames, remove frames, and/or navigates to different frames corresponding to the first layer. Moreover, in response to user interaction with the animation canvas, the animation management system generates a modified set of frames for the first layer (e.g., adds, removes, or modifies digital design objects for individual frames). Moreover, in response to selection of a second animation layer tile, the animation management system provides an additional set of frames corresponding to a second layer for display via the one-dimensional layer motion element with similar options and functionality for modifying and manipulating the second layer.

In addition, the animation management system also provides digital animations for display. For example, the animation management system combines animation layers and corresponding digital design objects in generating a digital animation. In some embodiments, different layers have a different number of frames. In one or more implementations, the animation management system combines layers by repeating/looping the frames of different layers. For example, the animation management system cycles through different layers at different frequencies (e.g., repeating a first layer with five frames every five frames of the digital animation while repeating a second layer with eight frames ever eight frames of the digital animation).

As also mentioned above, in one or more embodiments, the animation management system generates animation paths for digital animations. To illustrate, in one or more embodiments, the animation management system receives user input indicating animation frames and a path for those animation frames. Accordingly, in some embodiments, the animation management system generates a digital animation that illustrates digital design objects from the animation frames moving according to the animation path and cycling through the set of animation frames.

Additionally, in some embodiments, the animation management system generates animation paths utilizing a variety of path settings. To illustrate, the animation management system receives and implements settings according to a user-selected speed and a user-selected repeating pattern (e.g., boomerang or continuous loop). Additionally, in one or more embodiments, the animation management system scatters digital design objects on an animation path, introduces multiple instances of a digital design object on an animation path, varies digital design object movement along the animation path, and various other animation effects.

As mentioned above, conventional animation management systems suffer from several problems with regard to efficiency, accuracy, and efficiency. For example, as mentioned above, some conventional systems provide user interfaces that include a two-dimensional array of different animation channels to modify different layers of a digital animation. The user interfaces of these conventional systems, however, are inefficient, confusing, and difficult to operate. For example, because of the large volume of layers and/or frames, conventional systems that utilize two-dimensional grids often overwhelm the user interface, making it difficult to view or interact with individual user interface elements. These user interfaces often result in inaccuracies due to imprecise user inputs or interactions (resulting from crowded interface elements). Moreover, these user interfaces inefficiently utilize computing resources to render and animate an entire grid of user interface elements. Such conventional systems are also inflexible because they often cannot be implemented on mobile devices with more limited screen space. Indeed, such rigid two-dimensional grids often cannot be implemented on tablets or smartphones.

Other conventional systems do not utilize a two-dimensional grid, and do not provide a user interface element for manipulating individual layer frames. For example, some conventional systems provide a canvas that illustrates fames comprising all digital design objects of a digital animation. Although these systems can reduce the amount of screen space utilized relative to two-dimensional grids, they also undermine functionality, efficiency, and accuracy. For example, these conventional systems inhibit the ability to identify and modify digital design objects for different layers corresponding to different frames. Accordingly, these conventional systems multiply user interactions and make it more difficult to isolate and accurately modify sub-portions of a digital animation.

Furthermore, conventional systems also have a variety of problems in generating certain digital animations. For example, to animate rain falling utilizing conventional systems often requires an excessive number of user interactions. To illustrate, conventional systems require a client device to identify and process user interactions for drawing one or more raindrops and user interactions to repeatedly duplicate and translate the raindrops to different portions of a frame. Then, to illustrate animation of the rain, a client device would receive and identify duplicative interactions for all other subsequent frames to duplicate and move individual rain drops to give the appearance of animated particles. This conventional approach requires excessive time, user interactions, and computing resources (e.g., memory and processing) to implement. Moreover, these conventional systems often undermine accuracy in that clients must visually align individual particles to follow the desired animation.

Some conventional systems seek to resolve these problems by providing animations based on pre-defined patterns or textures. For example, some conventional systems reveal a pre-defined image or animation of rain at locations of a digital animation identified by the user. However, these conventional systems are limited to a set of rigid pre-defined options. Moreover, these pre-defined templates are not only rigid but often fail to accurately align to the unique themes or contexts of a particular animation.

The animation management system can provide a variety of advantages and benefits relative to conventional systems. For example, the animation management system accurately and efficiently generates and modifies digital animations by providing a one-dimensional layer motion element based on user selection of animation layer tiles corresponding to animation layers. To illustrate, by providing a one-dimensional layer motion element corresponding to animation frames and options associated with the selected animation layer, the animation management system receives and interprets user input modifying a particular digital design object of a specific layer and frame. In contrast to conventional systems that utilize two-dimensional grids, the animation management system can provide this tailored functionality without inefficiently utilizing screen real estate or computer resources. Indeed, in one or more embodiments the animation management system provides a single one-dimensional layer motion element that dynamically alternates between layers to reduce the number of user interface elements while still providing flexibility and functionality of multi-layer frame manipulation. This approach results in fewer inaccuracies in user interactions and limits the computing resources required to provide a variety of different channels corresponding to different layers. Furthermore, this approach allows the animation management system to operate across a variety of devices and user interfaces, including mobile devices.

Moreover, in one or more embodiments the animation management system also provides improved functionality and efficiency relative to conventional systems that do not provide grid interface elements for manipulating individual layer frames. For instance, the animation management system allows clients to granularly identify and modify individual digital design objects corresponding to individual frames with few user interactions by utilizing a one-dimensional layer motion element. Thus, in one or more embodiments the animation management system improves flexibility and avoid excessive interactions and inaccuracies resulting from attempting to modify all objects of a digital animation through a combined canvas or channel.

Furthermore, the animation management system can improve conventional systems by generating digital animations utilizing animation paths. For instance, by generating a digital animation of one or more digital design objects along one or more animation paths, the animation management system significantly reduces the number of user interactions, time, and computing resources needed to generate digital animations. Indeed, in one or more implementations, the animation management system generates a digital animation of raindrops falling through a handful of user interactions defining animation paths for a rain drop and indicating the desired animation features. In addition, by generating digital animations along animation paths, in one or more embodiments the animation management system improves accuracy by aligning digital design objects to particular paths to create more consistent, realistic animation.

Moreover, the animation management system can improve conventional systems that reveal pre-defined patterns or textures. For instance, the animation management system is not limited to preset textures, thus allowing client devices to generate a variety of digital design objects, animations, and animation features. Moreover, in one or more embodiments, the animation management system accurately generates digital animations that match the surrounding colors, themes, and contexts of a digital animation.

As illustrated by the foregoing discussion, the present disclosure utilizes a variety of terms to describe features and advantages of the animation management system. Additional detail is now provided regarding the meaning of such terms. For example, as used herein, the term "digital animation" refers to a combination of animation frames or images. In some embodiments, digital animations include a sequential display of frames or images portraying one or more digital design objects. For instance, a digital animation includes a plurality of animation frames from a plurality of animation layers. In one or more embodiments, when displayed sequentially, a digital animation portrays various digital design objects in motion.

Additionally, as used herein, the term "animation frame" refers to a unit (e.g., temporal unit) of a digital animation (e.g., a digital image in a sequence of digital images). For instance, an animation includes a single layer or a combination of different layers. In one or more embodiments, the animation management system generates digital animations by generating a plurality of animation frames including digital design objects from different animation layers. Further, in some embodiments, the animation management system plays animation frames sequentially as a digital animation.

Further, as used herein, the term "animation layer" refers to a portion of digital content corresponding to a digital animation. For instance, the term "animation layer" includes a subset of digital design objects portrayed in a digital animation across one or more animation frames. In one or more embodiments, the animation management system assigns particular digital design objects to particular animation layers (e.g., based on user input). Accordingly, in one or more embodiments an animation layer corresponds to animation frames specific to that animation layer (e.g., a first set of digital design objects for a first layer can appear in three frames corresponding to the first layer, whereas a second set of digital design objects for a second layer can appear in five frames corresponding to the second layer). In some embodiments, the animation management system combines (e.g., overlays) various animation frames from various animation layers to generate digital animations. Further, in some embodiments, the animation management system utilizes animation layers to isolate and modify a subportion of a digital animation.

Also, as used herein, the term "animation canvas" refers to a graphical user interface element for displaying and/or editing a digital animation and/or an animation frame. For instance, the term "animation canvas" includes an interface for generating and/or manipulating digital design objects, drawing animation paths, generating animation frames and animation layers, etc. In one or more embodiments, the animation management system generates animation frames, animation layers, and digital animations based on user interactions with an animation canvas. In some embodiments, the animation management system provides the animation canvas in a graphical user interface alongside various additional animation options.

Further, as used herein, the term "animation layer tile" refers to a graphical user interface element corresponding to an animation layer. For instance, the term "animation layer tile" includes a visual indication of a single representative animation frame (or a representative digital design object) from a corresponding animation layer. Additionally, in some embodiments, the animation management system modifies an animation canvas to allow or facilitate generation or modification of digital design objects from a particular animation layer corresponding to a selected animation layer tile.

Additionally, as used herein, the term "one-dimensional layer motion element" refers to a graphical user interface element showing animation frames corresponding to a particular animation layer. In particular, the term "one-dimensional layer motion element" can include animation frames corresponding to a selected animation layer and can show a currently selected animation frame. Further, in some embodiments, a one-dimensional layer motion element can include an option to add or remove animation frames to the selected animation layer.

Also, as used herein, the term "animation timeline element" refers to a graphical user interface showing a representation of a current frame in an overall animation (e.g. a current frame relative to global frame representations). For instance, the term "animation timeline element" includes a representation of a current frame and a highlighted, colored, or otherwise differentiated selected portion of the animation timeline element. For example, the animation timeline element includes shapes representing frames and a colored or shaded shape representing a currently selected frame.

Relatedly, as used herein, a "global frame representation" refers to a visual illustration or element of a combined animation frame reflecting different animation layers (e.g., a global frame). As mentioned above, each animation layer can have a set of corresponding animation frames. For example, the animation management system combines these animation frames in generating a digital animation (e.g., generating a sequence of global frames). Global frame representations include visual indications of these combined animation frames for a digital animation or. Further, as used herein, the term "current frame representation" refers to a visual illustration or element of a currently selected or "active" frame in a graphical user interface.

Further, as used herein, the term "digital design object" refers to a digital shape, digital graphic, digital text, digital vector, digital image, digital animation, or other digital visual object. To illustrate, a digital design object includes a movable and/or editable visual object within a digital design document. Thus, for example, a digital design object includes a visual illustration of a car, bird, or person. A digital animation can include a variety of digital design objects across various animation frames and/or animation layers.

Additionally, as used herein, the term "animation path" refers to a track or route defining motion of a digital design object. For instance, the term "animation path" includes a user-selected line, curve, or curvilinear object defining motion for one or more digital design objects of an animation layer in a digital animation. To illustrate, the animation management system moves digital design objects along user-selected animation paths according to various animation settings, and in tandem with additional animation effects.

Relatedly, as used herein, the term "path animation modification element" refers to a graphical user interface for modifying one or more features of an animation path. For instance, the term "path animation modification element" includes a graphical user interface for modifying the functionality, movement, shape, or other features of an animation path. To illustrate, a path animation modification element includes a particle animation number element (e.g., for modifying a number of instances of a digital design object); a random animation element (e.g., for randomizing movement of a digital design object along an animation path); a path orientation alignment element (e.g., for modifying the orientation of one or more digital design objects to align to an animation path); a path velocity element (e.g., for modifying velocity of one or more digital design objects along an animation path; and/or a "scatter element" (e.g., for positioning digital design objects at a scattered offset along an animation path).

The following disclosure provides additional detail regarding the animation management system in relation to illustrative figures portraying example embodiments and implementations. For example, FIG. 1 illustrates a schematic diagram of a system environment (or "environment") 100 for implementing an animation management system 102 in accordance with one or more implementations. As shown in FIG. 1, the environment 100 includes server(s) 104 that include a digital content management system 106 and the animation management system 102, which communicate via a network 108 with a client device 110 including a client application 112. Moreover, as illustrated the client device 110 can also implement all or a portion of the digital content management system 106. An overview of the animation management system 102 is described in relation to FIG. 1. Thereafter, a more detailed description of the components and processes of the animation management system 102 is provided in relation to the subsequent figures.

As shown in FIG. 1, the server(s) 104 and the client device 110 are connected via the network 108. As shown, in one or more implementations, each of the components of the environment 100 communicate via the network 108. The network 108 comprises a suitable network over which computing devices are able to communicate. Example networks are discussed in additional detail below in relation to FIG. 10.

As shown, the environment 100 includes the server(s) 104. The server(s) 104 include the digital content management system 106, which includes the animation management system 102. The server(s) 104 generate, store, receive, and/or transmit digital information including digital animations, animation layers, animation frames, user interfaces (e.g., including a one-dimensional layer motion element), etc. In particular, in one or more implementations, the server(s) 104 provide digital animations and various components of digital animations to devices such as the client device 110. The server(s) 104 are able to communicate with the client device 110 via the network 108. The server(s) 104 optionally comprise a content server, an application server, a communication server, a web-hosting server, or a digital content management server.

As further shown in FIG. 1, the server(s) 104 includes a digital content management system 106 (e.g., that manages, collects, generates, and/or modifies digital images and/or digital video). In one or more embodiments, the digital content management system 106 comprises an animation management system 102 that communicates digital information over the network 108. The digital content management system 106 also performs various backend functions associated with the generation and management of various digital content (e.g., digital design objects, digital animations, etc.). As illustrated in FIG. 1, the animation management system 102 is implemented as part of the digital content management system 106.

As shown, the environment 100 also includes the client device 110, which includes the client application 112. The client device 110 may generate, store, receive, and send digital data. For example, the client device 110 detects input from a generating or modifying a digital image and provides an indication of the user input to the animation management system 102 via the network 108. In various implementations, the client device 110 is associated with a user (e.g., a user client device).

Figure 10:
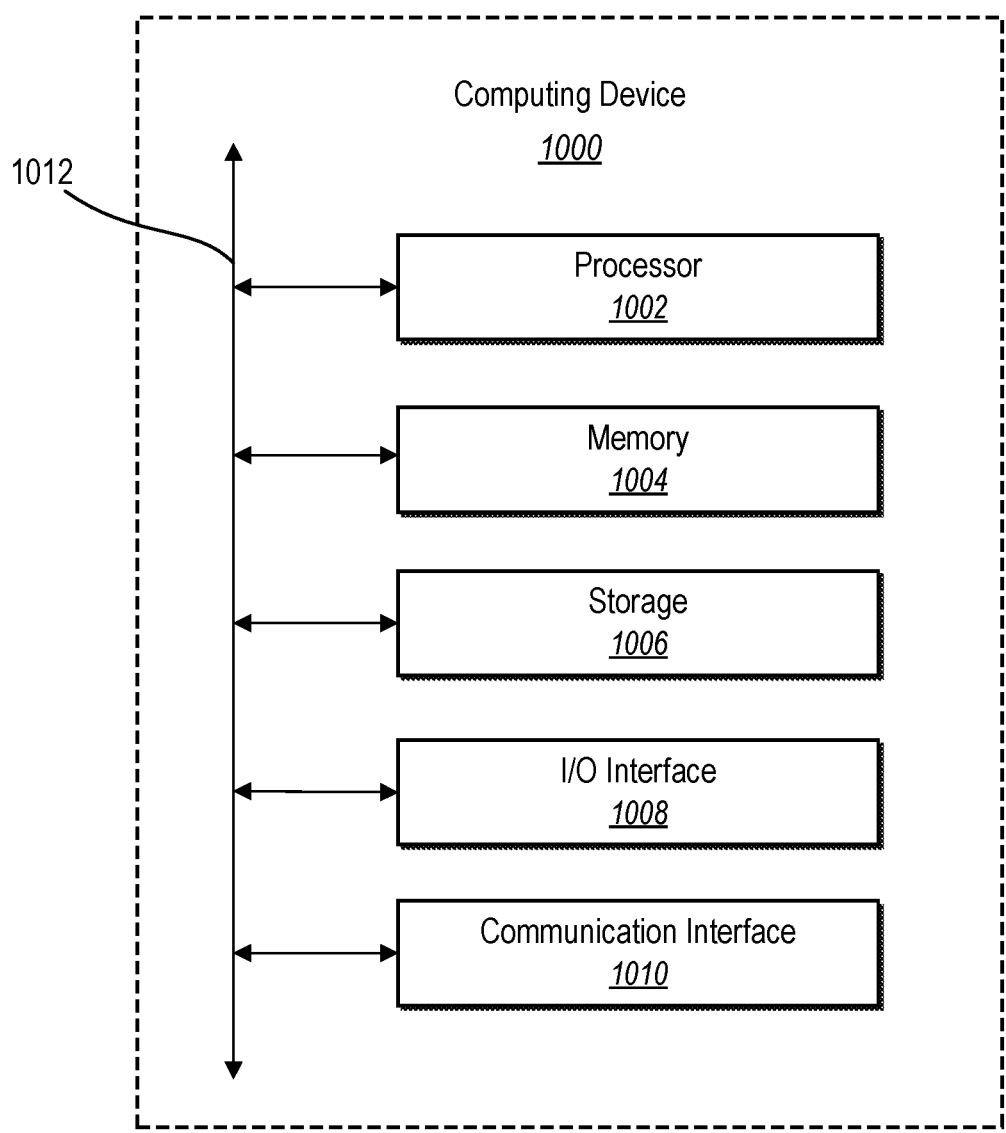
FIG. 10 illustrates a block diagram of an example computing device for implementing one or more embodiments of the present disclosure.

The client device 110 is one of a variety of computing devices, including a smartphone, a tablet, a smart television, a desktop computer, a laptop computer, a virtual reality device, an augmented reality device, or another computing device as described in relation to FIG. 10. Although FIG. 1 illustrates a single instance of the client device 110, in some implementations, the environment includes multiple different client devices, which may be associated with different users.

In one or more embodiments, the client device 110 performs one or more actions with relation to the environment 100 utilizing the client application 112. In some embodiments, the client application 112 manages user input and provides graphical user interfaces associated with the animation management system 102. The client application 112 may be a web application or a native application on the client device 110 (e.g., a mobile application, a desktop application, etc.). In one or more implementations, the client application 112 is a browser that renders a graphical user interface on the display of the client device 110.

As shown in FIG. 1, in one or more embodiments, the animation management system 102 is also implemented via the client device 110. In particular embodiments, the animation management system 102 on the client device 110 comprises a web application, a native application installed on the client device 110 (e.g., a mobile application, a desktop application, a plug-in application, etc.), or a cloud-based application where part of the functionality is performed by the server(s) 104. In some embodiments, the animation management system 102 on the client device 110 performs operations and provides functionality as described herein without accessing the server(s) 104. For example, the animation management system 102 on the client device 110 presents or displays information to a user associated with the client device 110, including digital animations and user interfaces described herein. In some implementations, as shown, the animation management system 102 on the client device 110 provides a user interface comprising a one-dimensional layer motion element 120 and/or elements for generating a path animation 122.

Figure 2:
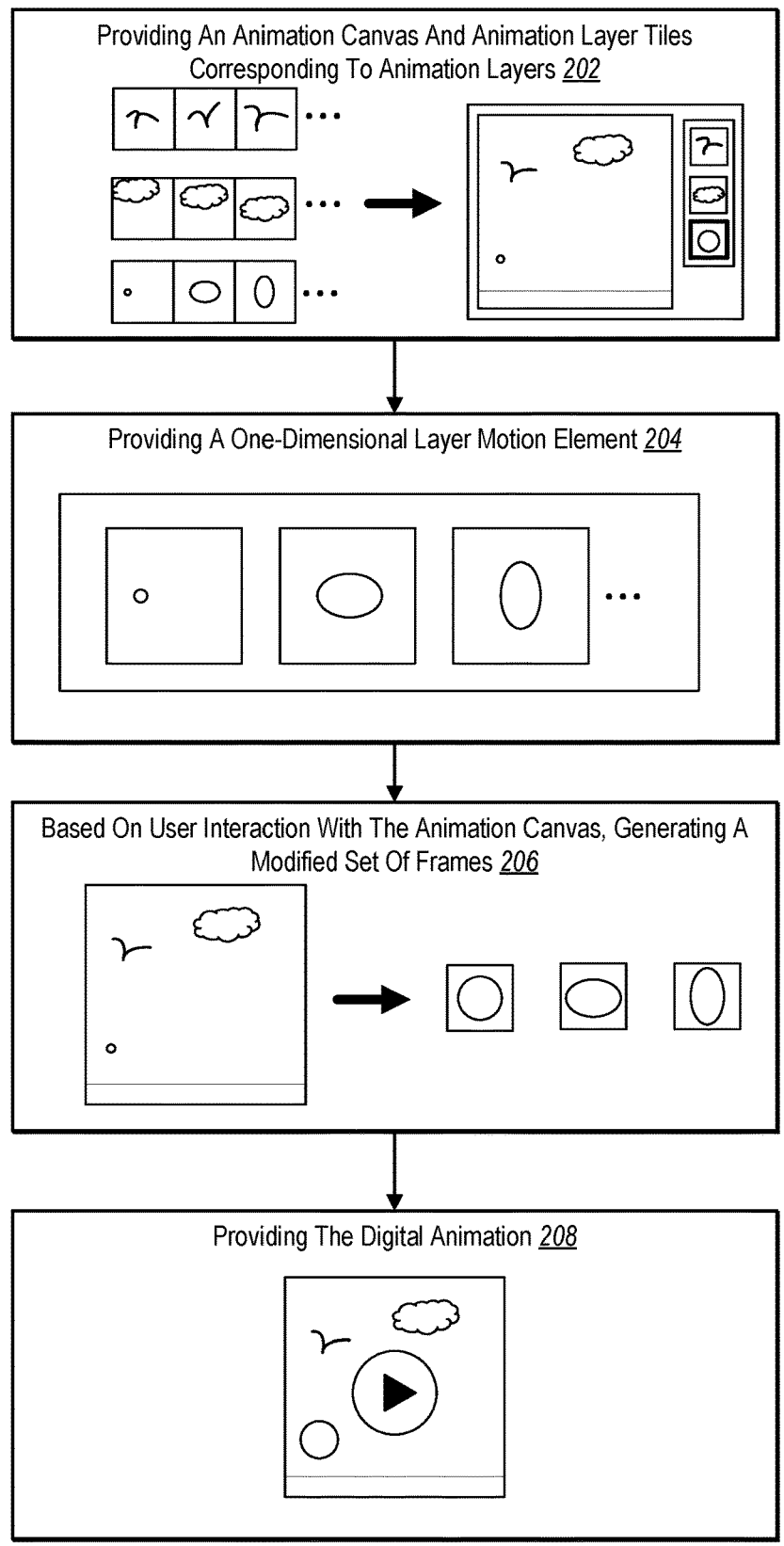
FIG. 2 illustrates an overview of a process for utilizing a one-dimensional layer motion element to generate a modified digital animation in accordance with one or more embodiments.

As discussed above, in some implementations the animation management system 102 generates, modifies, and provides digital animations utilizing a one-dimensional layer motion element. FIG. 2 illustrates an overview of utilizing a one-dimensional layer motion element to generate and/or modify digital animations in accordance with one or more embodiments. More specifically, as shown in FIG. 2, the animation management system 102 performs an act 202 of providing an animation canvas and animation layer tiles corresponding to animation layers. In one or more embodiments, the animation management system 102 provides a graphical user interface including an animation canvas for interacting with digital design objects. More specifically, the animation management system 102 provides an animation frame for display via the animation canvas based on user interactions with animation layer tiles and/or a one-dimensional layer motion element.

Accordingly, the animation management system 102 provides the graphical user interface including animation layer tiles. More specifically, as shown in FIG. 2, in one or more embodiments, the animation management system 102 provides an animation layer tile corresponding to each animation layer of a digital animation. In some embodiments, the animation management system 102 also provides options to add or remove additional animation layers. Further, in some embodiments, in response to user interaction with an animation layer tile, the animation management system 102 provides an animation frame from the selected animation layer for display via the animation canvas.

As also shown in FIG. 2, the animation management system 102 performs an act 204 of providing a one-dimensional layer motion element. As shown in FIG. 2, the one-dimensional layer motion element is a graphical user interface element that includes selectable options for each animation frame of a selected animation layer. Additionally, in some embodiments, the animation management system 102 includes an option to add or remove animation frames for the animation layer. Further, in one or more embodiments, the one-dimensional layer motion element includes options for digital animations in the selected animation layer. For example, the one-dimensional layer motion element includes options for looping or repeating animations, interacting with other animation layers, speed of playback of the animation (e.g., frames per second), etc.

Further, as shown in FIG. 2, the animation management system 102 performs an act 206 of, based on user interaction with the animation canvas, generating a modified set of frames. To illustrate, the animation management system 102 receives user input modifying a digital design object in the selected animation layer and animation frame. The example animation shown in FIG. 2 includes three animation frames. The user input enlarges the circle in the first of the three animation frames. Based on receiving this user input, the animation management system 102 modifies the digital animation to reflect the modification (e.g., modifies the global animation frame that incorporates the change from the selected animation layer).

Thus, as shown in FIG. 2 the animation management system 102 performs an act 208 of providing the digital animation. More specifically, the animation management system 102 provides the digital animation with the modifications received and implemented at the act 206. Accordingly, the animation management system 102 generates the digital animation by aggregating animation frames from each animation layer into global animation frames based on settings corresponding to each animation layer. Further, the animation management system 102 can playback the digital animation via a computing device based on received user input.

As mentioned above, in some implementations the animation management system 102 provides a graphical user interface for generating and modifying digital animations including an animation canvas, animation layer tiles, and a one-dimensional layer motion element. FIGS. 3A-3F illustrate example graphical user interfaces for the animation management system 102 in accordance with one or more embodiments. Further, FIGS. 3A-3F illustrate example user interactions in utilizing a one-dimensional layer motion element to efficiently modify animation frames. Additionally, FIGS. 3A-3F illustrate corresponding changes to digital animations at various stages of interaction.

For example, FIGS. 3A-3F illustrate a computing device 300 displaying a graphical user interface 320 that includes an animation canvas 302, animation layer tiles 304, and a one-dimensional layer motion element 306. Additionally, FIGS. 3A-3F illustrate global animation frames 301a-301f of a digital animation. The global animation frames 301a-301f show the global animation frames corresponding to the computing device 300 and the changes to those animation frames throughout FIGS. 3A-3F. However, the global animation frames 301a-301f are provided for illustrative purposes (to illustrate how modifications within the user interface impact the overall digital animation) and need not be included in the graphical user interface 320 of the computing device 300.

Figure 3A:
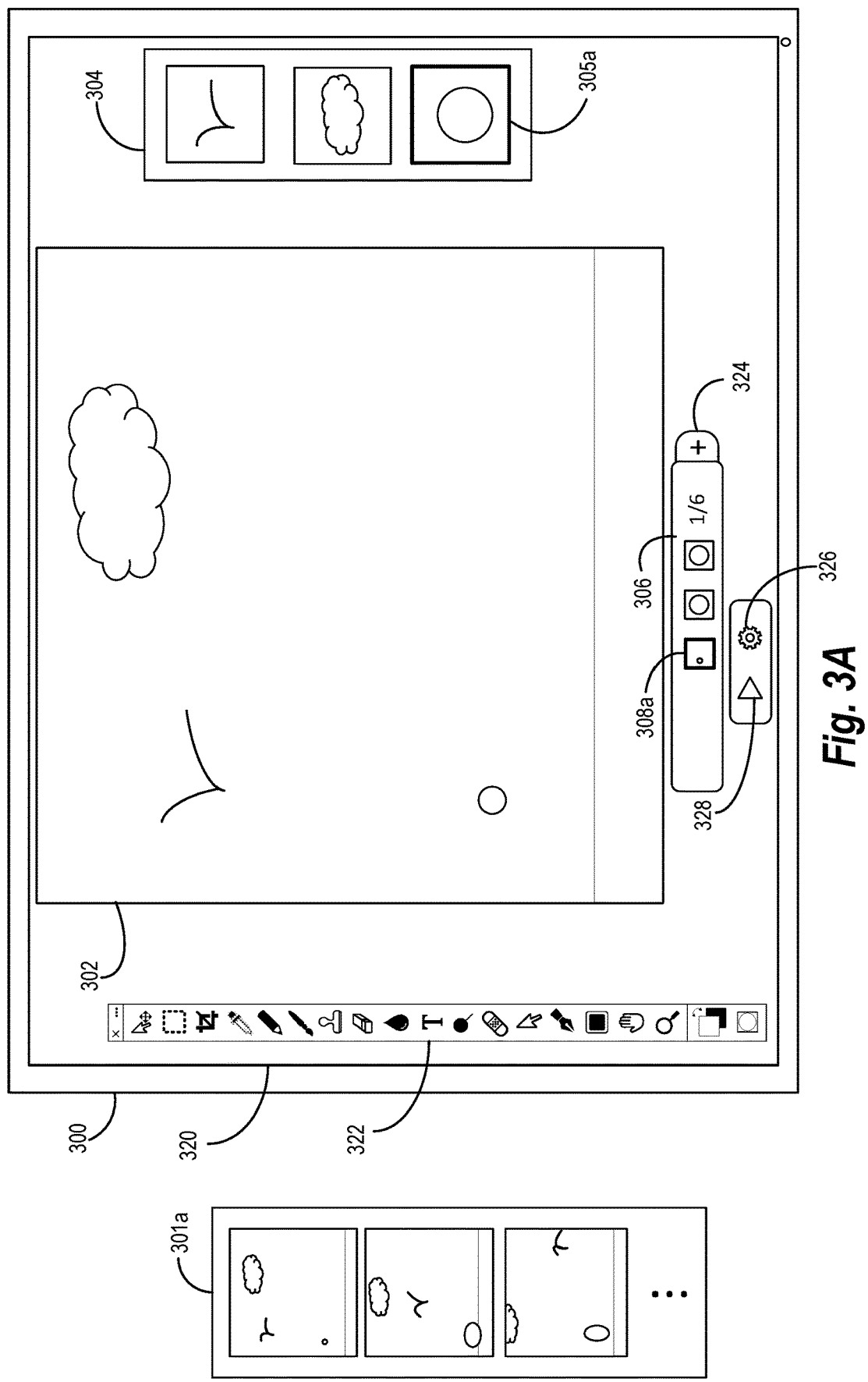

For instance, with regard to FIG. 3A the animation canvas 302 portrays an animation frame (i.e., a global animation frame) for a digital animation with three animation layers. As mentioned above, in one or more embodiments the animation canvas 302 illustrates various digital design objects in an animation frame of a digital animation. The animation management system 102 determines which animation frame to include in the animation canvas 302 based on user selection of an animation frame via the one-dimensional layer motion element 306.

Further, the animation management system 102 determines which animation layer or animation layers to present in an animation frame. For example, FIG. 3A illustrates the animation canvas 302 portraying all animation layers of the digital animation for a particular animation frame. In some embodiments, the animation canvas 302 portrays a subset of animation layers (e.g., one or two layers). For instance, the animation management system 102 provides selectable user interface elements indicating what animation layers to portray in the animation canvas 302. In some implementations, the animation management system 102 portrays only the animation layer corresponding to a selected animation layer tile (e.g., the animation layer tile 305a).

In one or more embodiments, the animation management system 102 (via the computing device 300) detects user input at the animation canvas 302. The animation management system 102 detects user input at the animation canvas 302 via a variety of interaction types. For example, in an embodiment where the computing device 300 includes a touch screen, the animation management system 102 can interpret touch input received via the animation canvas 302 from a stylus, finger, etc. In addition, or in the alternative, the animation management system 102 receives user input received via a keyboard, mouse, or other input device associated with or included in the computing device 300.

The animation management system 102 generate and modifies digital animations and digital design objects at different layers based on these user interactions. For instance, in relation to FIG. 3A, the animation management system 102 previously received drawing interactions with the animation canvas 302 (e.g., drawing bird shapes, cloud shapes, ball shapes) and animation tools 322. Moreover, the animation management system 102 assigned the digital design objects created by these interactions to particular layers and frames (e.g., based on user selection of layers and frames for the digital design objects).

As shown in FIG. 3A, the animation management system 102 provides animation layer tiles 304 for display. The animation layer tiles 304 reflect the animation layers within the digital animation. As mentioned above, the animation layer tiles 304 portray a representative image of an animation layer (or a digital design object of an animation layer). In relation to FIG. 3A, the animation layer tiles correspond to a bird (for a first animation layer that includes a bird digital design object), a cloud (for a second animation layer that includes a cloud digital design object), and a ball (for a third animation layer that includes a ball digital design object). However, it will be appreciated that the animation layer tiles 304 can include a variety of digital design objects corresponding to a variety of types and arrangements of animation layers.

In FIG. 3A, an animation layer tile 305a is currently selected (e.g., active). The animation layer tile 305a corresponds to the animation layer including the ball digital design object. The animation management system 102 applies modifications received via the animation canvas 302 to the active layer corresponding to the animation layer tile 305a. Moreover, as shown in FIG. 3A, the one-dimensional layer motion element 306 reflects frames from the animation layer corresponding to the animation layer tile 305a. In particular, upon user interaction with the animation layer tile 305a, the animation management system 102 populates the one-dimensional layer motion element 306 with frames of the corresponding animation layer.

More specifically, as shown in FIG. 3A, the one-dimensional layer motion element 306 includes three animation frames corresponding to the selected animation layer. Further, the one-dimensional layer motion element 306 includes a selected animation frame 308a of these animation frames. The animation management system 102 can modify the selected animation frame (e.g., based on a swipe or touch gesture).

Additionally, as shown in FIG. 3A, the one-dimensional layer motion element 306 includes an indication of the global frame included in the animation canvas 302. As mentioned previously, the number of animation frames in a particular layer can differ from the total number of animation frames in a digital animation. For example, a second layer can include six animation frames while a first layer only includes three animation frames. In relation to FIG. 3A, the selected layer includes only three frames, but there are a total of six global animation frames. Thus, the one-dimensional layer motion element 306 includes "⅙" to indicate that the current frame selected in the animation canvas is the first of six frames. As shown in FIG. 3A, in response to receiving user selection of the selected animation frame 308a, the animation management system 102 provides the first global animation frame in the animation canvas 302.

As also shown in FIG. 3A, the one-dimensional layer motion element 306 includes a frame element 324 for generating additional animation frames for the active animation layer. In response to receiving user interaction with the frame element 324, the animation management system 102 generates an additional animation frame for the selected layer. In one or more embodiments, the animation management system 102 associates the additional frame from the active layer based on settings for the active layer. Accordingly, the animation management system 102 generates an updated digital animation with the updated animation frames for the animation layer (i.e., including the newly generated animation frame).

As illustrated, the animation management system 102 also provides an animation initiation element 328 and a settings element 326 via the user interface 320. Based in user interaction with the animation initiation element 328 the animation management system 102 provides the digital animation for display via the animation canvas 302. For example, the animation management system 102 combines the animation frames corresponding to the animation layers to generate the global animation frames 301a and cycle through the global animation frames 301a to display the digital animation. For instance, the animation management system 102 overlaps a first set of frames of a first animation layer with a second set of frames from a second animation layer.

In one or more embodiments, the animation management system 102 provides the digital animation for display by looping through animation frames of the animation layers. For instance, the animation management system 102 iteratively loops modified set of frames (for the active layer) with additional frames corresponding to additional animation layers.

For example, in relation to FIG. 3A, the animation layer illustrated in the one-dimensional layer motion element 306 includes three frames, while there are six frames corresponding to another animation layer (e.g., the bird animation layer) and six global animation frames. Accordingly, the animation management system 102 cycles through these three animation frames twice before cycling through all of the frames for the other animation layers. In relation to the embodiment of FIG. 3A, this means that the ball in the bottom left corner will appear to bounce twice before the animation of the bird completes its flight animation a single time. The animation management system 102 thus combines the first animation frame of the ball layer (shown in the one-dimensional layer motion element) with the fourth animation frame of the bird layer in generating the fourth global animation frame. Similarly, the animation management system 102 combines the second animation frame of the ball layer with the fifth animation frame of the birder layer in generating the fifth global animation frame.

As mentioned, the user interface 320 also includes a settings element 326. Based on user interaction with the settings element 326, the animation management system 102 provides various selectable options for modifying settings corresponding to the digital animation. For example, the animation management system 102 provides a selectable option to implement a continuous loop of the digital animation layers. Additionally, the animation management system 102 provides a selectable option to control framerate for an individual animation layer (or all animation layers). Further, the animation management system 102 provides a selectable option for selecting a first global frame at which to implement an animation layer (e.g., delay the ball entering the digital animation until after the first five frames have already played). The animation management system 102 utilizes each of these settings for each animation layer in order to accurately generate digital animations while reducing or eliminating excess user inputs.

Thus, the animation management system 102 generates digital animations based on user interaction with the animation canvas 302, the animation layer tiles 304, and the one-dimensional layer motion element 306. More specifically, the animation management system 102 generates animation layers including one or more animation frames. Further, in one or more embodiments, the animation management system 102 generates a digital animation by overlaying the animation layers so that they overlap one another. To illustrate, the animation management system 102 iteratively loops the sets of animation frames from each animation layer concurrently. Further, the animation management system 102 overlays the animation layers based on various animation layer settings, including a layer order, layer opacity, etc.

Figure 3B:
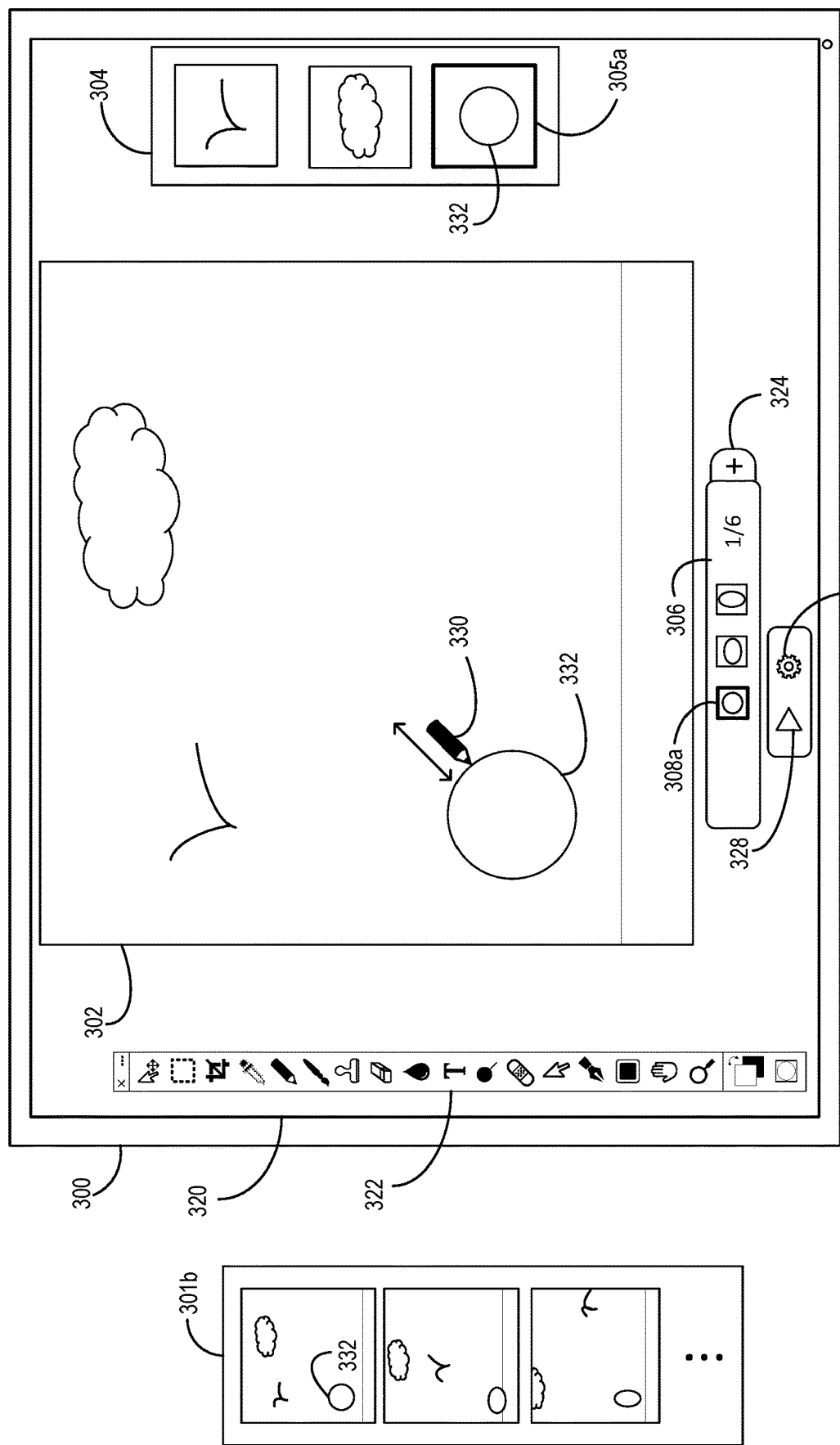

As mentioned above, in one or more embodiments the animation management system 102 receives and promulgates modifications to animation frames via the animation canvas 302. FIG. 3B illustrates generating a modified set of frames in accordance with one or more embodiments. More specifically, as shown in FIG. 3B, the animation management system 102 detects or receives user input 330 enlarging a digital design object 332. In one or more embodiments, the computing device 300 can detect this user input via a touch gesture on a touch screen, from a mouse click and drag, etc. The computing device 300 can provide an indication of the user input to the animation management system 102.

Based on receiving this indication of user input, the animation management system 102 generates a modified set of frames for the animation layer. Specifically, the animation management system 102 implement the change to the digital design object in the animation canvas 302. the selected animation layer, and the digital animation. Accordingly, as shown in the global animation frames 301b, the digital design object 332 is enlarged in the digital animation. To illustrate, for the animation shown in FIG. 3B, the animation management system 102 modifies the digital design object 332 in both the first global animation frame and the fourth global animation frame, both of which correspond to the first animation frame of the selected animation layer.

As also shown in FIG. 3B, the animation management system 102 promulgates modifications to the animation layer tiles 304 and the one-dimensional layer motion element 306. More specifically, as shown in FIG. 3B, the selected animation layer tile 305a includes the enlarged digital design object 332. Additionally, the selected animation frame 308a includes the enlarged digital design object 332. Thus, the animation management system 102 generates a revised set of animation frames corresponding to the animation layer based on user interaction with the animation canvas 302. Moreover, the animation management system 102 generates a digital animation that reflects the modified set of frames (in combination with frames from other animation layers).

Although FIG. 3B illustrates a specific modification to a digital design object of an animation frame, the animation management system 102 can implement a variety of different changes. For example, the animation management system 102 can modify colors or shapes, add additional frames, remove frames, add digital design objects to an animation layer, and/or remove digital design objects from an animation layer. Indeed, in some embodiments the animation management system 102 implements a variety of modifications to satisfy the needs of the particular animation project at issue. Moreover, the animation management system 102 provides the modified digital animation for display by cycling through the modified set of frames.

Furthermore, in some embodiments, the animation management system 102 also provides visual indicators of previous or future frames in the animation canvas 302 to assist in making modifications to individual frames. Thus, although not illustrated in FIG. 3B, the animation management system 102 can illustrate a digital design object from a previous or subsequent frame for the current animation layer (e.g., show the ball for the next animation frame to help align the current revisions). In some embodiments, the animation management system 102 changes the visual qualities of digital design objects for previous or subsequent frames. For example, the animation management system 102 changes the saturation and/or opacity for previous and/or subsequent frames (e.g., saturate and/or make opaque in a first direction and desaturate and/or make less opaque in a second direction).

Figure 3C:
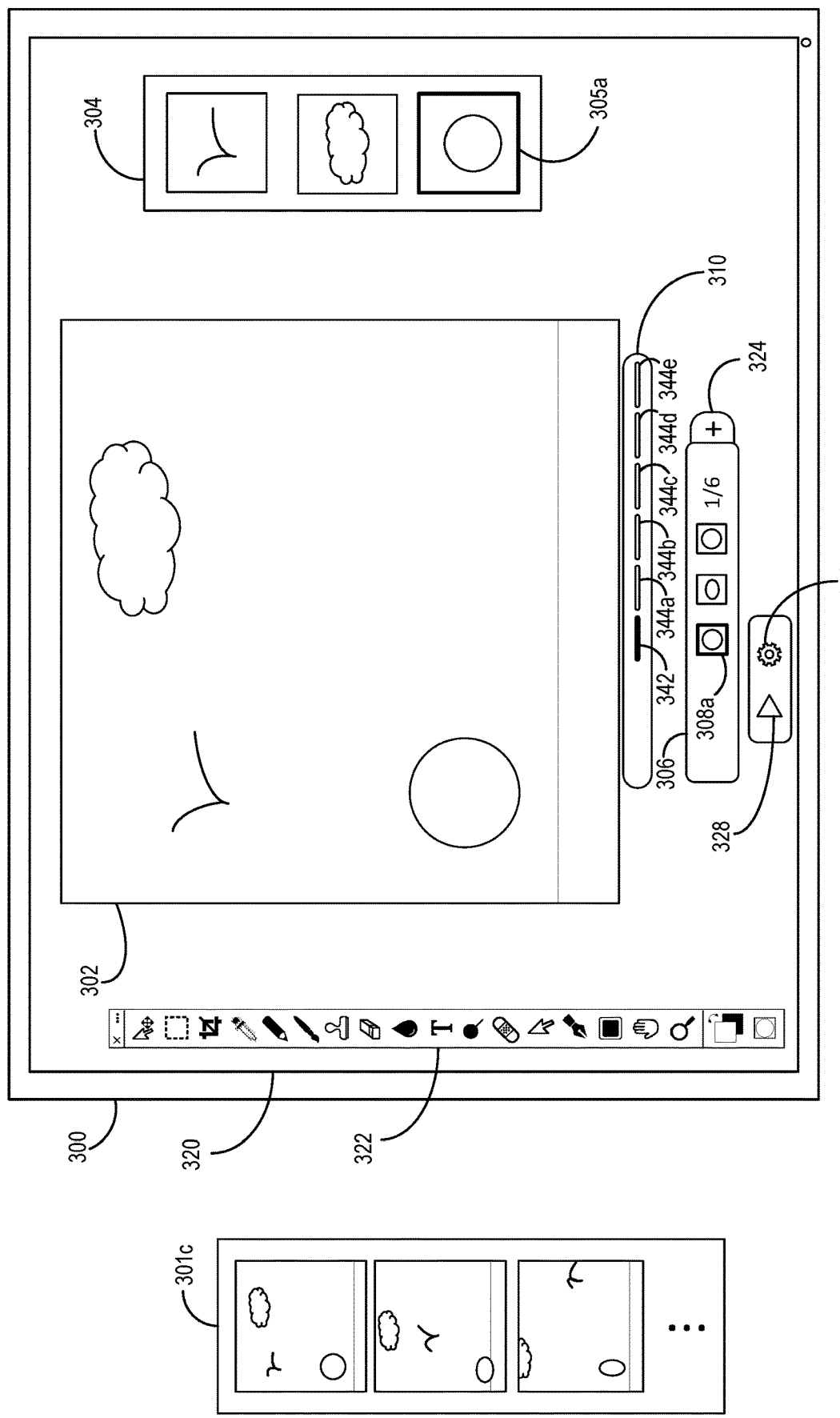

As mentioned above, the animation management system 102 can also include an animation timeline. FIG. 3C illustrates the animation management system 102 providing the user interface 320 that including an animation timeline element 310. As shown, the animation timeline element 310 includes a current frame representation 342 that indicates which global frame is currently included in the animation canvas 302 (and the one-dimensional layer motion element 306). To illustrate, the current frame representation 342 indicates which frame representation is currently selected within a sequence of global frame representations, including the global frame representations 344a-344d.

As discussed above, the animation management system 102 can determine a number of global animation frames by combining animation frames for various animation layers. In relation to FIG. 3C, there are three frames in a ball layer and six frames in a bird layer with a total of six global frames. Thus, the animation management system 102 determines that there are six global frame representations for the digital animation based on the plurality of animation layers. In response to the animation management system 102 adding additional frames (e.g., seven frames), the animation management system 102 modifies the animation timeline to illustrate a modified sequence of global frames (e.g., to show seven frames instead of six).

As shown in FIG. 3C, the animation timeline element 310 includes elongated ovals to represent global animation frames. Because the global animation frame currently included is the animation canvas 302 is the first of six, the animation timeline element 310 includes the current frame representation 342 as the first oval filled in. However, it will be appreciated that the animation timeline element 310 can include a variety of representations of global animation frames and a variety of indications of a current frame representation.

In one or more embodiments, the animation management system 102 modifies which global animation frame is currently included in the animation canvas 302 based on user interactions with the animation timeline element 310 (and/or the one-dimensional layer motion element 306). Additionally, the animation management system 102 can scroll or "scrub" through a digital animation based on user interaction in order to facilitate easy location of global animation frames, especially for digital animations with a large number of global animation frames. Upon receiving user selection of a global animation frame at the animation timeline element 310, the animation management system 102 provides an indication of which, if any, animation frame from the selected animation layer corresponds to the current global animation frame at the one-dimensional layer motion element 306. Thus, the animation management system 102 positions a current frame representation (corresponding to a frame displayed within the one-dimensional layer motion element 306) within a sequence of global frame representations (e.g., based on combining the plurality of animation layers to determine the global frame animations for the digital animation).

As mentioned previously, the animation management system 102 can provide a digital animation for display via the animation canvas 302. For example, the animation management system 102 cycles through the global animation frames 301c via the animation canvas 302. In addition, in some embodiments, the animation management system 102 provides a digital animation for display utilizing the animation canvas 302, the one-dimensional layer motion element 306 and/or the animation timeline element 310. For example, in response to user interaction with an animation initiation element, the animation management system 102 cycles through the global animation frames 301c via the animation canvas 302, cycles through the global animation frame representations 342, 344a, 344b, 344c, 344d, and 344e (e.g., changes the current global animation frame to reflect the frame shown in the animation canvas 302), and cycles through the layer animation frames (e.g., modified animation layer frames) via the one-dimensional layer motion element 306 (e.g., changes the current animation frame within the one-dimensional layer motion element 306 to align to the global animation frame displayed in the animation canvas 302). In this manner, during playback of a digital animation, a client can view the overall digital animation, the location of the global animation frame within the overall scene, and the location of the animation frame within a particular animation layer.

To illustrate, in playing the digital animation, the animation management system 102 determines a sequence of active frames from the animation frames of a selected layer. The animation management system 102 utilizes the one-dimensional layer motion element 306 to cycle through the modified set of frames according to the digital animation. Indeed, the animation management system 102 displays a first active frame for the animation layer via the one-dimensional layer motion element 306, then displays a second active frame for the animation via the one-dimensional layer motion element 306, where the first active frame and the second active frame align to a first global animation frame and a second global animation frame portrayed via the animation canvas 302 (and align to a first current global frame representation and a second current global frame representation of the animation timeline 310).

As mentioned above, the animation management system 102 can modify which animation layer is currently active in the animation canvas 302 and populating the one-dimensional layer motion element 306. To illustrate, an active animation layer is one currently available for generating or modifying digital design objects in the animation canvas 302. FIG. 3D illustrates that, in response to user interaction with the animation layer tiles 304, the animation management system 102 modifies the active animation layer and replaces the animation layer portrayed in the one-dimensional layer motion element 306

More specifically, as shown in FIG. 3D, the animation management system 102 receives an indication of user interaction with the animation layer tile 305b. In response to receiving the indication of the user interaction with the selected animation layer tile 305b, the animation management system 102 bolds the border of the selected animation layer tile 305b. However, as discussed above with regard to FIG. 3A, the animation management system 102 can indicate that the selected animation layer tile 305b is selected utilizing a variety of visual indicators. As shown in FIG. 3B, the selected animation layer tile 305b includes a digital design object that looks like a bird. Accordingly, based on receiving user interaction at the selected animation layer tile, the animation management system 102 makes the animation layer corresponding to the bird digital design object active in the animation canvas 302.

Additionally, the animation management system 102 modifies the one-dimensional layer motion element 306 based on receiving the user input at the selected animation layer tile 305b. More specifically, the animation management system 102 replaces frames within the one-dimensional layer motion element 306 to include animation frames corresponding to the same animation layer as the animation layer tile 305b (e.g., replaces the first animation layer corresponding to the animation layer tile 305a with the second animation layer corresponding to the animation layer tile 305b). Accordingly, the one-dimensional layer motion element 306 includes animation frames including bird digital design objects. Further, the one-dimensional layer motion element includes the selected animation frame 308b that corresponds both to the active animation layer and to the global animation frame currently included in the animation canvas 302.

Although FIG. 3D illustrates selection of a second animation layer, it will be appreciated that the animation management system 102 also operates with regard to additional selections of additional animation layers. For example, the animation management system 102 can receive a user interaction with a third animation layer (via a third animation layer tile) and replace the set of frames within the one-dimensional layer motion element 306 for the second animation layer with the set of frames of the third animation layer.

Figure 3E:
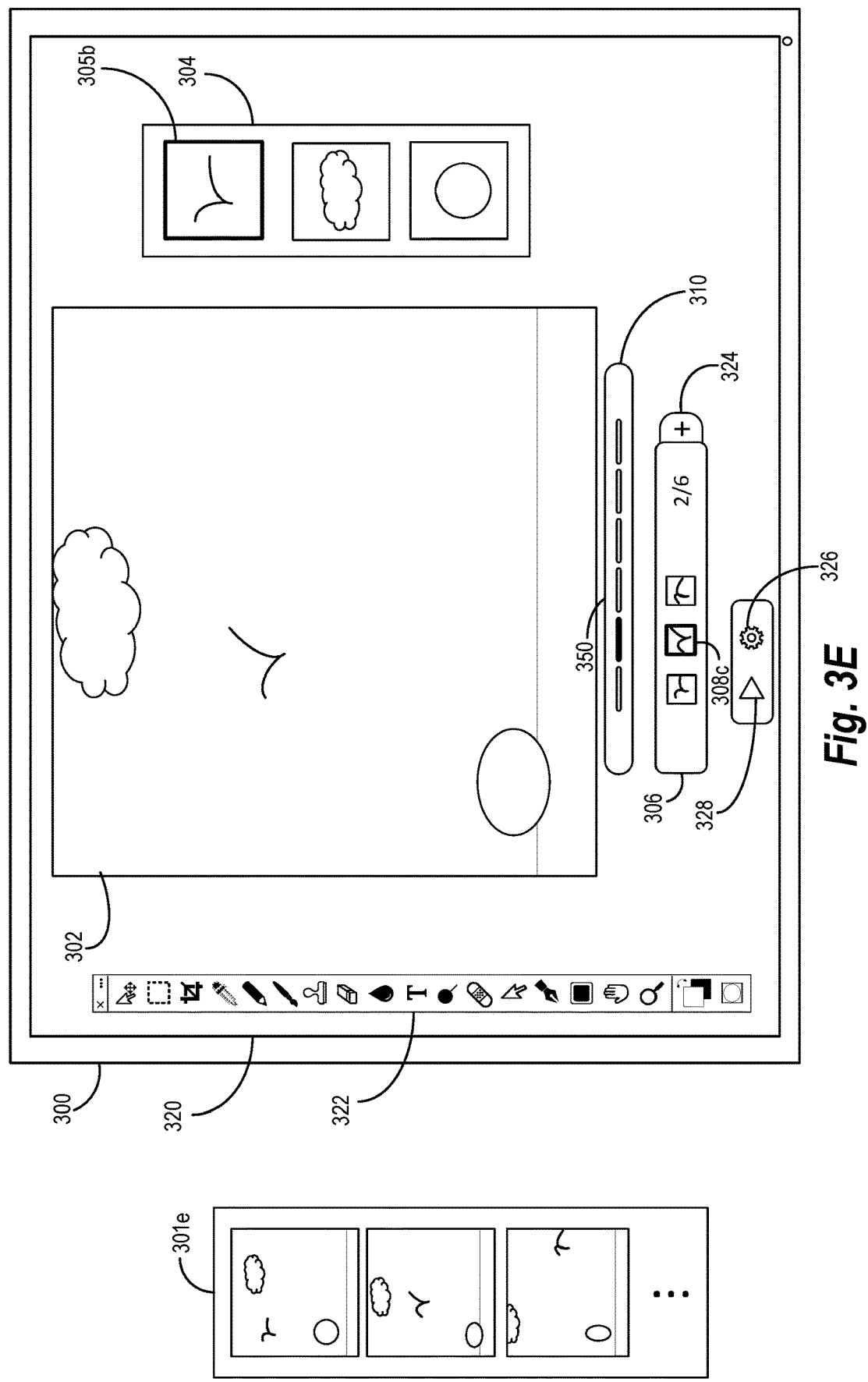

In addition to modifying the active animation layer based on user input, the animation management system 102 can modify the global animation frame included in the animation canvas 302. FIG. 3E illustrates the animation management system 102 modifying the animation canvas 302 in response to an updated user selection of a different frame. More specifically, the animation management system 102 can receive an indication of user interaction with the selected animation frame 308c. In addition, or in the alternative, the animation management system 102 can receive an indication of user interaction with the animation timeline element 310 selecting the second global animation frame 350. Based on one or more of the selection of the selected animation frame 308c via the one-dimensional layer motion element 306 and/or the second global animation frame 350 via the animation timeline element 310, the animation management system 102 provides, for display, the animation canvas 302 portraying the second global animation frame. To illustrate, the second global animation frame corresponds to the second animation frame for the active animation layer.

Additionally, as shown in FIG. 3E, in response to the user selection, the animation management system 102 provides the one-dimensional layer motion element 306 bolding the outline of the selected animation frame 308c. However, as discussed above with regard to FIG. 3A, the animation management system 102 can visually indicate the selection of the selected animation frame 308c in a variety of ways. Further, as shown in FIG. 3E, the animation management system 102 provides the one-dimensional layer motion element 306 including an indication that the global animation frame included in the animation canvas 302 is "2/6."

FIG. 3E also shows that the animation management system 102 modifies the animation timeline element 310 in response to the received user input. To illustrate, the animation management system 102 provides the animation timeline element 310 with a different current frame representation. To illustrate, the animation management system 102 provides the animation timeline element 310 including the second oval filled in to indicate that the second global animation frame 350 is currently included in the animation canvas 302. However, as mentioned above, the animation management system 102 can utilize a variety of visual indicators of what global animation frame is current via the animation timeline element 310.

Figure 3F:
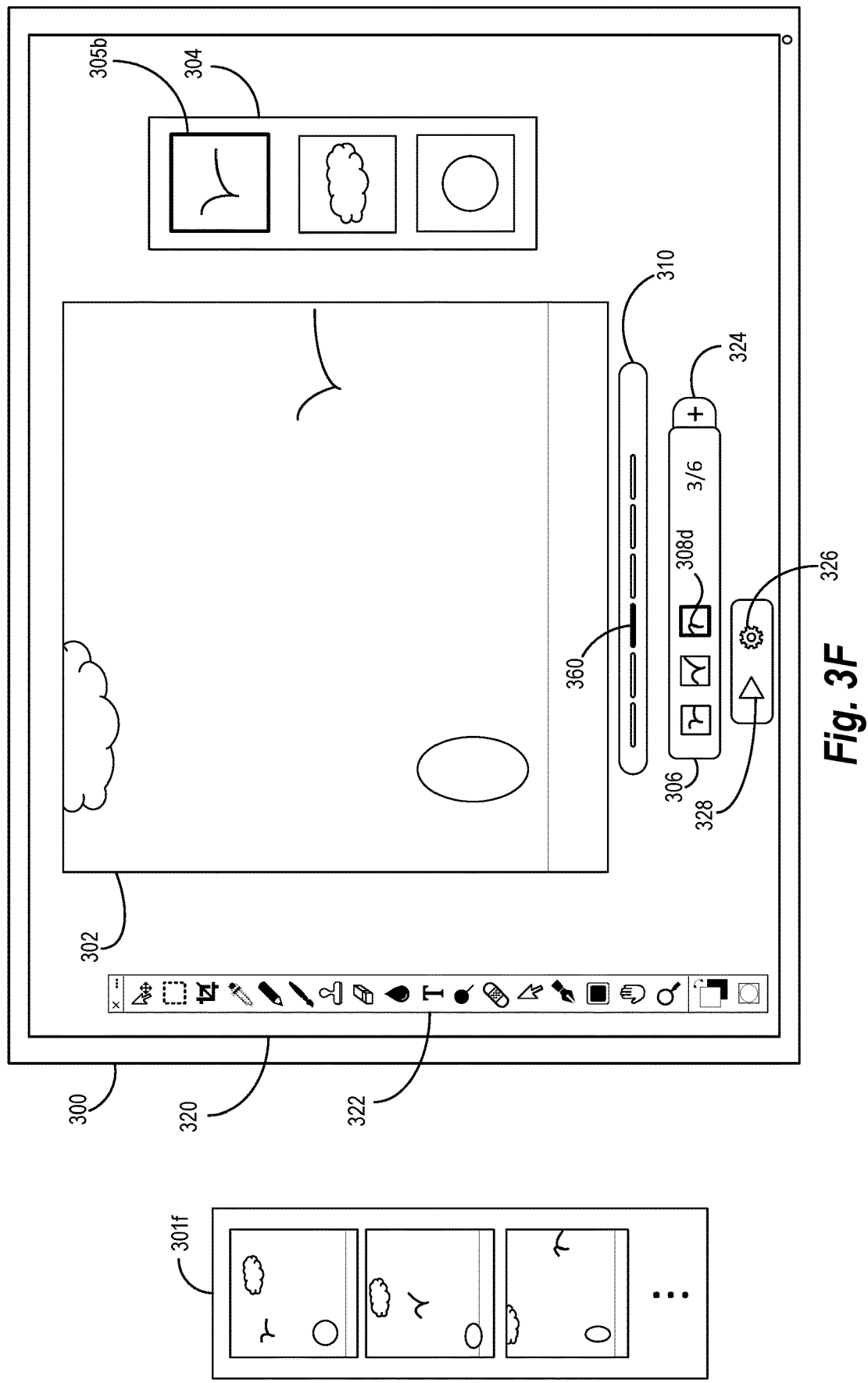

Turning to FIG. 3F, the animation management system 102 can further modify the animation canvas 302 to include a third selection of a third global animation frame. To illustrate, as shown in FIG. 3F, the animation management system 102 can provide global animation frame three of six in via the animation canvas 302. In one or more embodiments, the animation management system 102 receives an indication of user interaction with the animation frame 308d. Additionally, in some embodiments, the animation management system 102 receives an indication of user interaction with the animation timeline element 310 selecting the third global animation frame representation 360. Based on the selection of the animation frame 308d and/or the third global animation frame representation 360 via the animation timeline element 310, the animation management system 102 provides the animation canvas 302 including the third global animation frame.

Additionally, as shown in FIG. 3F, in response to the user selection, the animation management system 102 provides the one-dimensional layer motion element 306 bolding the outline of the selected animation frame 308d. However, as discussed above with regard to FIG. 3A, the animation management system 102 can indicate the selected animation frame 308c in a variety of visual methods. Further, as shown in FIG. 3F, the animation management system 102 provides the one-dimensional layer motion element including an indication that the global animation frame included in the animation canvas 302 is "3/6."

FIG. 3F also shows that the animation management system 102 modifies the animation timeline element 310 in response to the updated user selection of a global animation frame. More specifically, the animation management system 102 provides the animation timeline element 310 with the third oval filled in to indicate that the third global animation frame is currently included in the animation canvas 302. However, as mentioned above, the animation management system 102 can utilize a variety of visual indicators of what global animation frame is current via the animation timeline element 310.

As also mentioned above, the animation management system 102 modifies a digital animation based on user interactions with the animation canvas 302. Accordingly, as discussed with regard to FIGS. 3A-3B, the animation management system 102 modifies the global animation frames 301a to the global animation frames 301b. However, while the animation management system 102 modifies the graphical user interface in FIGS. 3C-3F, the animation management system 102 does not receive any user input modifying the animation frames in FIGS. 3C-3F. Accordingly, the global animation frames 301c-f remain unchanged despite the modifications to the animation canvas 302, animation layer tiles 304, and the one-dimensional layer motion element 306.

Accordingly, utilizing the animation canvas 302, the animation layer tiles 304, the one-dimensional layer motion element 306, and or the animation timeline 310, the animation management system 102 provides a unique approach to generating and modifying digital images. Indeed, because the user interface 320 includes the one-dimensional layer motion element 306 (rather than a grid of multiple layer channels), the user interface 320 can emphasize the animation canvas 302 and provide a clear space for viewing frames, modifying frames, and displaying digital animations. Moreover, the animation management system 102 also provides the animation layer tiles 304 for efficient replacement of different animation layers within the one-dimensional layer motion element 306. Accordingly, the animation management system 102 provides an environment that allows clients to efficiently focus on individual layers across animation frames while also flexibly transferring between layers in constructing digital animations. Moreover, the animation management system 102 utilizes the animation timeline 310 to orient and navigate within global animation frames of the overall digital animation.

Figure 4:
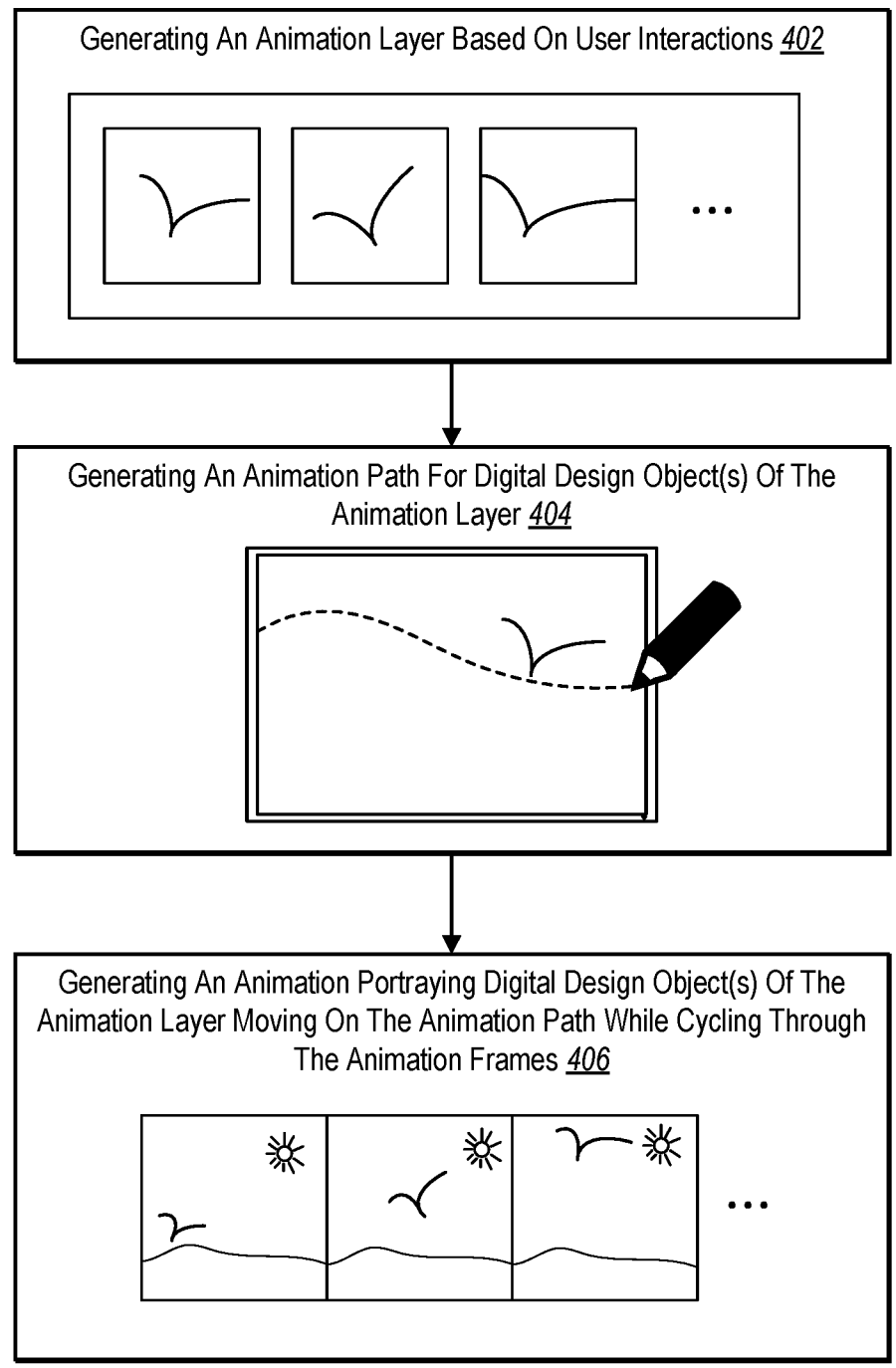
FIG. 4 illustrates an overview of a process for generating an animation moving along an animation path in accordance with one or more embodiments.

As discussed briefly above, the animation management system 102 can also generate and utilize animation paths for digital animations. For example, the animation management system 102 can generate an animation path for a sequence of digital design objects that, when played in sequence, form a digital animation. FIG. 4 provides an overview for a process of generating an animation path for a digital animation in accordance with one or more embodiments.

As shown in FIG. 4, the animation management system 102 performs an act 402 of generating an animation layer based on user interactions. More specifically, in one or more embodiments, the animation management system 102 receives indication of user input via an animation canvas. As discussed above with regard to FIGS. 3A-3F, the animation management system 102 can interpret user interaction with an animation canvas to generate animation frames for an animation layer. For example, as shown in FIG. 4, the animation management system 102 received user input generating a multi-frame animation of a bird. The animation management system 102 can organize the multi-frame animation into an animation layer as part of a digital animation.

Additionally, as shown in FIG. 4, the animation management system 102 performs an act 404 of generating an animation path for digital design object(s) of the animation layer. As shown in FIG. 4, the animation management system 102 receives an indication of user input drawing a path for the animation. However, in one or more embodiments, the animation management system 102 can receive a variety of types of user input selecting a pathway for an animation path.

Based on selection of a pathway and the animation layer, the animation management system 102 can associate the animation layer and/or corresponding digital design objects with the animation path. Further, in one or more embodiments, the animation management system 102 receives user input selecting settings for the generated animation path and corresponding animation layer. Accordingly, the animation management system 102 can receive and implement settings for the animation path.

Additionally, as shown in FIG. 4, the animation management system 102 can perform an act 406 of generating an animation portraying digital design object(s) of the animation layer moving on the animation path while cycling through the animation frames. More specifically, the animation management system 102 can generate global animation frames by placing digital design objects from an animation layer along the animation path based on animation path settings.

For example, as shown in FIG. 4, the animation management system 102 places the bird animation along the animation path in global animation frames. To illustrate, the animation management system 102 generates the global animation frames so that the bird digital design objects from the animation layer appear to move along the animation path while cycling through the wing flapping motion. Further, the animation management system 102 places the digital design objects along the animation path based on the velocity, framerate, looping pattern, etc. indicated by the animation path settings.

Although FIG. 4 illustrates generating a digital animation that cycles through a plurality of frames of an animation layer, the animation management system 102 can also generate digital animations from a single frame (e.g., a single digital design object without additional animation between frames). For instance, the animation management system 102 can utilize an animation path to generate an animation that illustrates a single leaf blowing along a path. The animation management system 102 can apply a variety of feature effects utilizing animation paths.

For example, FIGS. 5A-5G illustrate the animation management system 102 implementing a variety of animation path settings based on user interactions with path animation modification elements in accordance with one or more embodiments. More specifically, FIGS. 5A-5G illustrate an example graphical user interface 540 that the animation management system 102 can implement to generate digital animations utilizing animation paths. More specifically, FIGS. 5A-5G illustrate a computing device 500 including an animation canvas 502 and a one-dimensional layer motion element 508. Additionally, FIGS. 5A-5G illustrate global animation frames 501a-501g corresponding to the current state of the animation canvas 502 with regard to each figure.

Figure 5A:
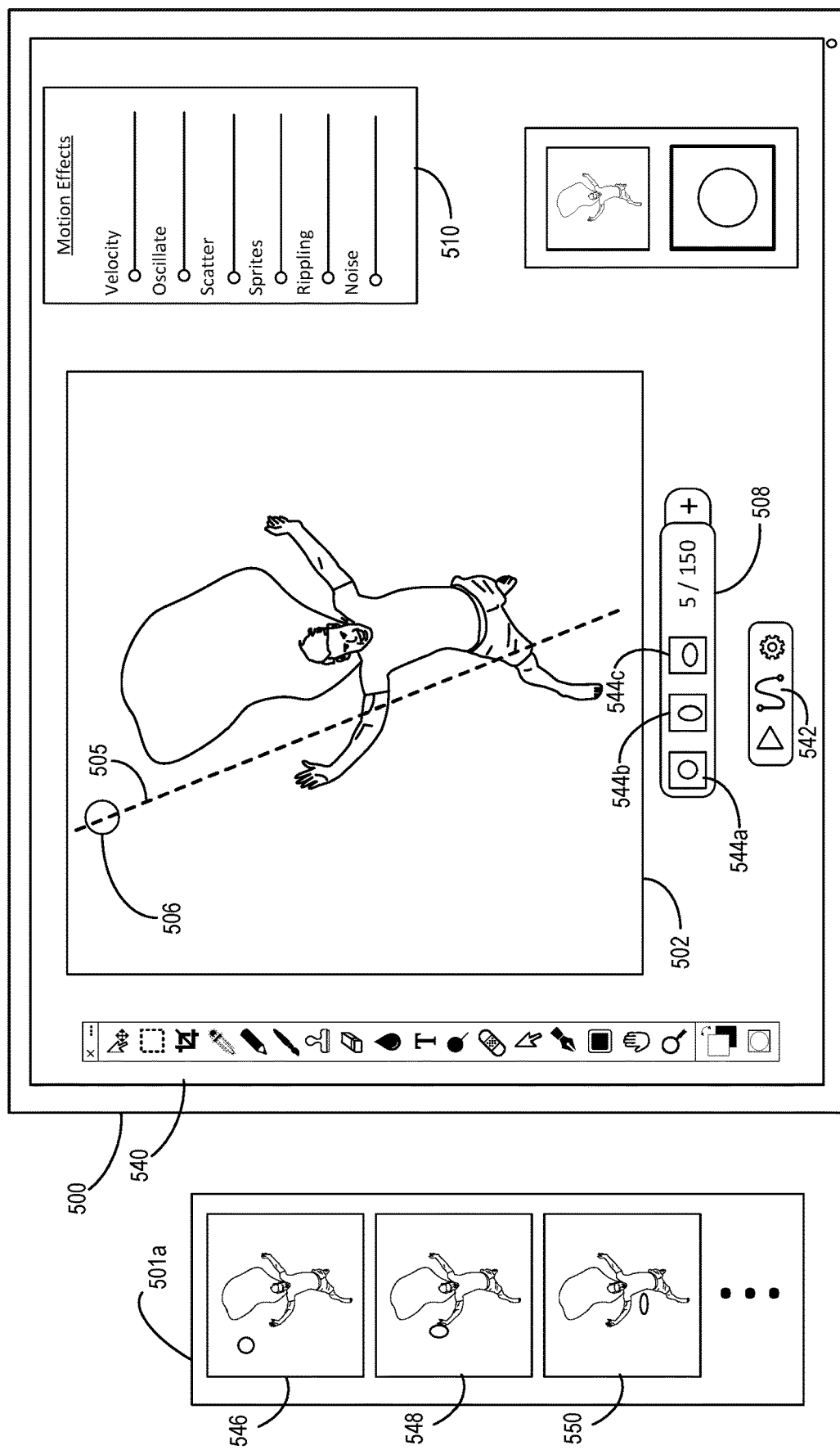
FIGS. 5A-5G illustrate an example graphical user interface for generating an animation path for digital design objects and various settings and modifications for animation paths in accordance with one or more embodiments.

As shown in FIG. 5A, the user interface 540 includes a selectable path animation element 542. In response to user interaction with the selectable path animation element 542, the animation management system 102 can receive or identify user input indicating an animation path. For example, the animation management system 102 can receive drawing inputs via the animation canvas indicating a spline defining an animation path.

For instance, as shown in FIG. 5A, the animation canvas 502 includes an animation path 505 and a digital design object 506. More specifically, FIG. 5A illustrates an example animation with two animation layers. FIG. 5A illustrates one animation layer portraying a man with a cape and another animation layer portraying the digital design object 506 (e.g., a rotating projectile). As illustrated, the animation layer includes three animation frames 544a-544c. In response to user interaction with the selectable path animation element 542 and an additional drawing input, the animation management system 102 generates the animation path 505 for the animation layer. Moreover, the animation management system 102 automatically generates frames that illustrate digital design objects of the animation layer moving along the animation path.

For example, as illustrated in the global animation frames 501a, the animation management system 102 generates a digital animation that illustrates the digital design objects of the animation frames 544a-544c moving along the animation path. Specifically, a first global animation frame 546 portrays the digital design object of the animation frame 544a at a first position along the animation path 505, a second global animation frame 548 portrays the digital design object of the animation frame 544b at a second position along the animation path 505, and a third global animation frame 550 portrays the digital design object of the animation frame 544c at a third position along the animation path 505. Notably, the user can draw the digital design objects at the same position (or close to the same position) within the animation canvas 502 but the animation management system 102 automatically generates the digital animation so that the digital design objects appear to move along the animation path 505 (while cycling through the animation frames 544a-544c of the animation layer).

To accomplish this result, the animation management system 102 maps the position of digital design objects within a coordinate space of the animated canvas 502 to new positions utilizing the animation path 505. For example, the animation management system 102 determines an initial position of the digital design object corresponding to the animation frame 544b. The animation management system 102 determines an animation vector between the first animation frame 544a and the second animation frame 544b along the animation path (e.g., a vector indicating movement along ⅓ of the animation path). The animation management system 102 applies the animation vector to the initial position of the digital design object corresponding to the animation frame 544b to generate its new position along the animation path 505. In this manner, the animation management system 102 can cycle through frames of an animation layer while also moving the digital design objects of the animation layer along an animation path.

Additionally, as shown in FIG. 5A, the computing device 500 displays a motion effects settings menu 510 comprising a plurality of path animation modification elements. The animation management system 102 generates a modification animation based on user input via the path animation modification elements. As shown in FIG. 5A, the motion effects settings menu 510 is a box to the side of the animation canvas 502 including various path animation modification elements. However, it will be appreciated that in one or more embodiments, the motion effects settings menu 510 can include additional or alternative motion effects settings. Further, though FIG. 5A illustrates the motion effects settings menu 510 including various path animation modification elements as sliding bars, the animation management system 102 can provide the motion effects settings menu 510 including a variety of types of graphical user interface elements. Additionally, in one or more embodiments, the animation management system 102 can provide the motion effects settings menu 510 as part of the one-dimensional layer motion element 508 or at another portion of a graphical user interface.

Figure 5B:
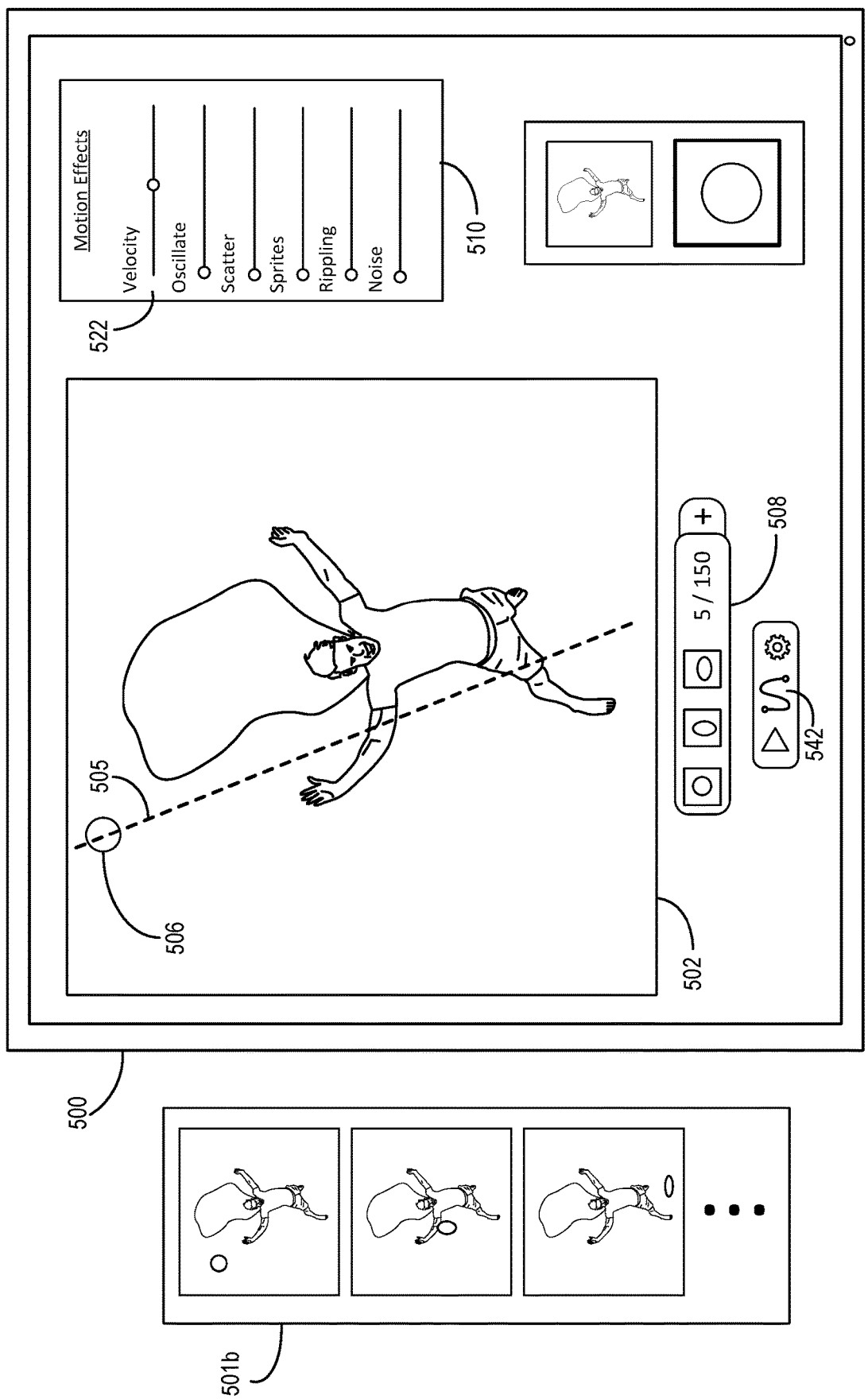

As mentioned above, the animation management system 102 can generate animation paths at various velocities for digital design objects. FIG. 5B illustrates the animation management system 102 implementing an adjustment to the velocity of an animation path. More specifically, FIG. 5B illustrates a path velocity element 522 adjusted to a higher velocity.

Accordingly, as shown in FIG. 5B, in response to the user input received at the path velocity element 522, the animation management system 102 modifies the global animation frames 501b show the digital design object 506 and the other digital design objects from the animation frame moving faster along the animation path 505 from frame to frame. FIG. 5B illustrates a large difference in velocity from the global animation frames 501a to the global animation frames 501b for purposes of animation, but the animation management system 102 can also make small adjustments to velocity that may not be easily discernable over the course of three animation frames. Indeed, the animation management system 102 can adjust the placement of digital design objects from the animation layer cycling through the set of animation frames along the animation path to portray a variety of velocities. Thus, for example, the animation management system 102 utilizes a larger animation vector (or displacement) along the animation path between frames for a higher velocity. In some embodiments, the animation management system 102 increases velocity by increasing a frame rate for a particular animation layer (e.g., double the frame rate for the selected animation layer).

Figure 5C:
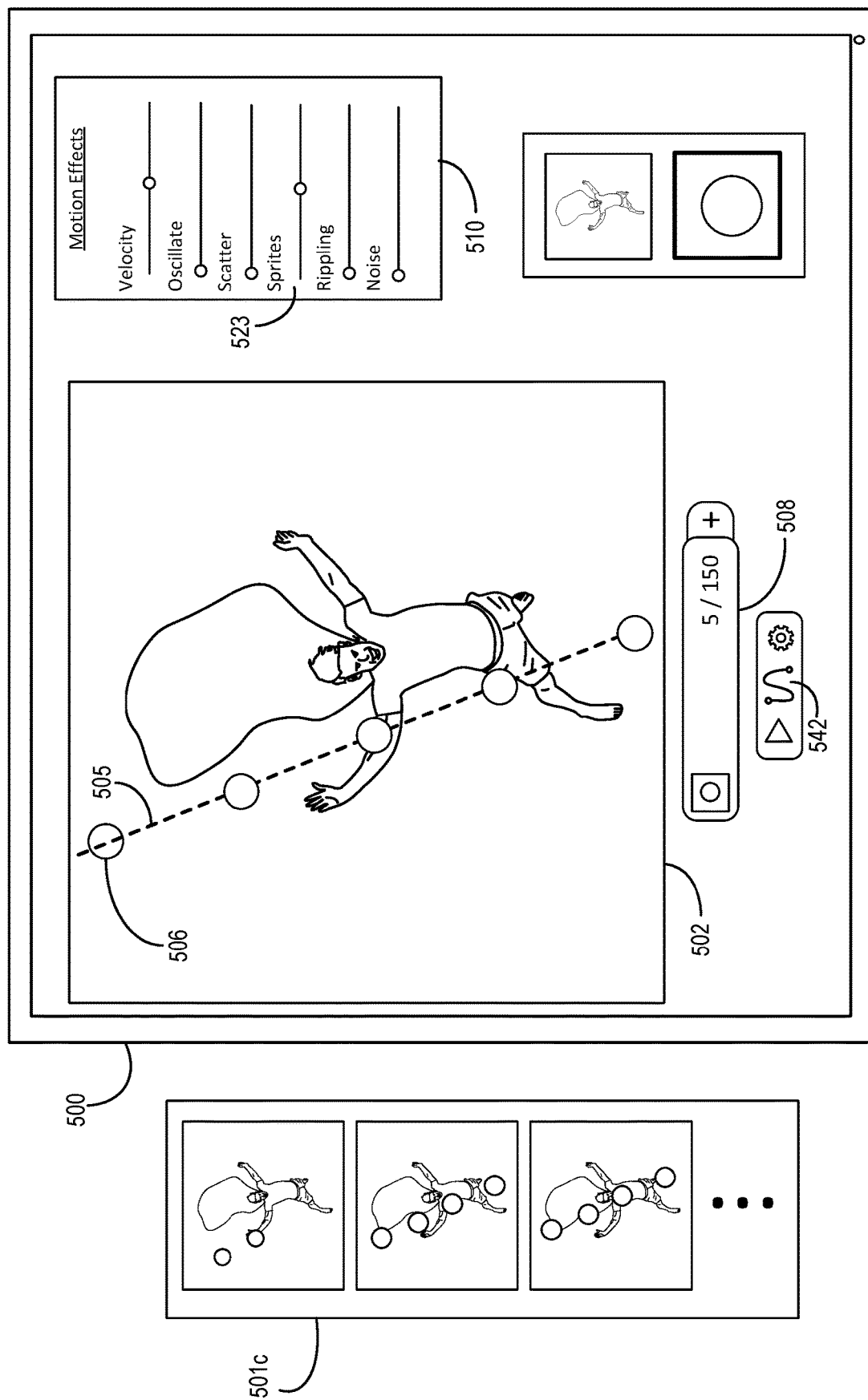

Additionally, in one or more embodiments, the animation management system 102 varies the number of instances of digital design objects moving according to an animation path. More specifically, the animation management system 102 determines a number of instances of each digital design object in a digital animation when generating the digital animation. FIG. 5C illustrates the animation management system 102 implementing an adjustment to a number of instances of the digital design object 506. More specifically, FIG. 5C illustrates a particle animation number element 523 adjusted to introduce additional instances.

Thus, as shown in FIG. 5C, in response to user interaction at the particle animation number element 523, the animation management system 102 determines a modified number of instances for the digital design object 506 and generates the modified number of instances of the digital design object 506 for the digital animation. For example, because the user interaction shown in FIG. 5C increases the selected instances, the animation management system 102 increases the number of instances of the digital design object 506 within the global animation frames 501c. More specifically, as shown in the global animation frames 501c, the animation management system 102 generates four instances of the digital design object. Moreover, the animation management system 102 generates the digital animation so that each instance appears to enter the scene and follow along the animation path 505. The animation management system 102 can introduce a variety of instances of digital design objects based on user selection.

Although FIG. 5C shows the animation canvas 502 with additional instances of the digital design object, in some embodiments, the animation management system 102 does not illustrate the additional instances of the digital design object within the animation canvas until playing the digital animation. For example, upon selecting the animation initiation element, the animation management system 102 cycles through the global animation frames 501c.

As mentioned above, the animation management system 102 can generate digital animations for a single digital design object in a single frame or for multiple digital design objects in multiple frames. For example, the active animation layer of FIG. 5C includes a digital design object in a single animation frame. Thus, the animation management system 102 generates the global animation frames 501c illustrating the digital design object moving along the animation path 505 (e.g., without cycling through multiple frames for the animation layer as the object moves along the path). It will be appreciated that the animation management system 102 can generate multiple instances that reflect multiple frames (e.g., can generate three instances, where each instance cycles through animation frames of an animation layer as part of the digital animation). In other words, although FIG. 5C illustrates a single frame, the animation management system 102 can also generate multiple particle instances where each instance cycles through a set of frames.

Figure 5D:
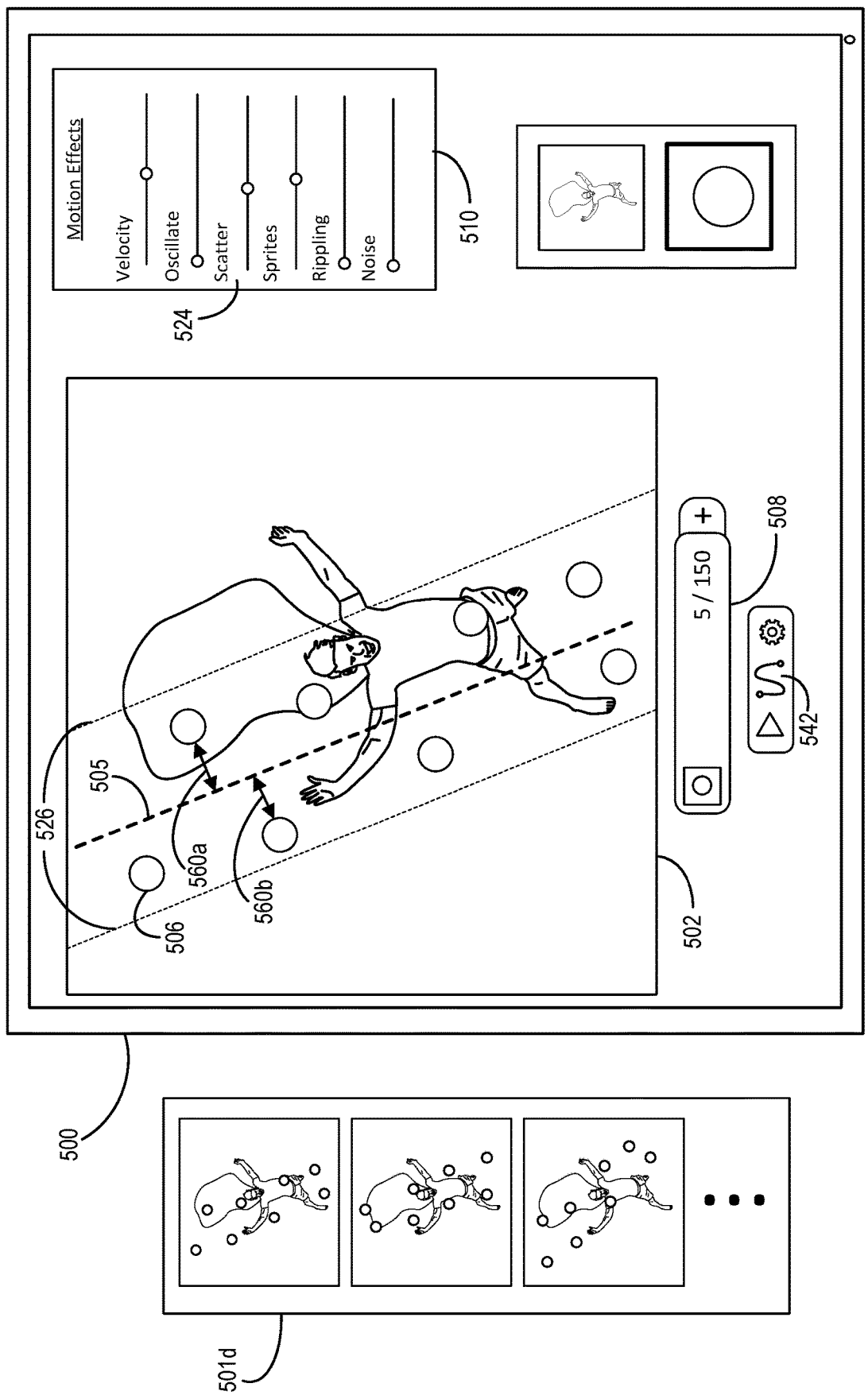

Further, in some embodiments, the animation management system 102 scatters digital design objects around an animation path rather than placing digital design objects directly on the animation path. FIG. 5D illustrates the animation management system 102 implementing an adjustment to scatter digital design objects along the animation path 505. More specifically, FIG. 5D illustrates a scatter element 524 adjusted to introduce scatter in the digital animation.

Based on receiving the user input via the scatter element 524, the animation management system 102 scatters a digital design object based on a scatter offset. For example, in relation to FIG. 5D, the animation management system 102 determines a first scatter offset 560a. Moreover, the animation management system 102 applies the first scatter offset by translating an instance of a digital design object from the animation path 505 (e.g., moves the digital design object perpendicular to the animation path 505 by the first scatter offset 560a).

As shown in FIG. 5D, the animation management system 102 determines different scatter offsets for different instances of a digital design object. Thus, for example, the animation management system 102 determines a second scatter offset 560b and applies the second scatter offset 560b to a second instance of a digital design object.

The animation management system 102 can determine different scatter offsets utilizing a variety of approaches. In some embodiments, the animation management system 102 randomly samples a scatter offset (e.g., from a distribution of scatter offsets). In one or more embodiments, the animation management system 102 utilizes a pre-determined pattern of scatter offsets.

In some embodiments the animation management system 102 also utilizes a scatter threshold 526 to determine a scatter offset. For example, the animation management system 102 constrains each scatter offset to fall within the scatter threshold 526. Thus, in one or more embodiments the scatter threshold 526 reflects a maximum distance from the animation path 505 for the instances of the digital design object 506. In one or more embodiments, the animation management system 102 makes the scatter threshold 526 larger or smaller based on the user selection via the scatter element 524. Further, the animation management system 102 modifies the scatter offset for the instances of the digital design object 506 from the animation path to randomly scatter within the scatter threshold 526.

Additionally, in response to receiving the user input via the scatter element 524, the animation management system 102 generates a modified digital animation. To illustrate, FIG. 5D shows the global animation frames 501d with scattered digital design objects relative to the global animation frames 501c. The animation management system 102 generates the global animation frames 501d to portray the instances of the digital design object 506 moving in a straight path parallel to the animation path 505.

FIG. 5D illustrates an animation layer with a single frame; thus, instances of the digital design object appear to move along the animation path, but the instances themselves do not cycle through additional frames. Although not illustrated in FIG. 5D, the animation management system 102 can also cycle through animation frames for each instance of an animation layer portraying a digital design object. Thus, for example, each instance illustrated in FIG. 5D can also cycle through a plurality of frames on an animation layer while each instance moves along the animation path 505.

Thus, as illustrated in FIG. 5C, the animation management system 102 receives a few user interactions and generates a complex animation of a variety of different instances of a digital design object moving according to an animation path. The animation management system 102 efficiently generates a plurality of instances of digital design objects falling according to a particular path, such as rain falling according to a driving wind, shots being fired from a weapon, leaves traveling along a path, a swarm of bees flying along a path, or other implementations that illustrate digital design objects scattered around a path.

Figure 5E:
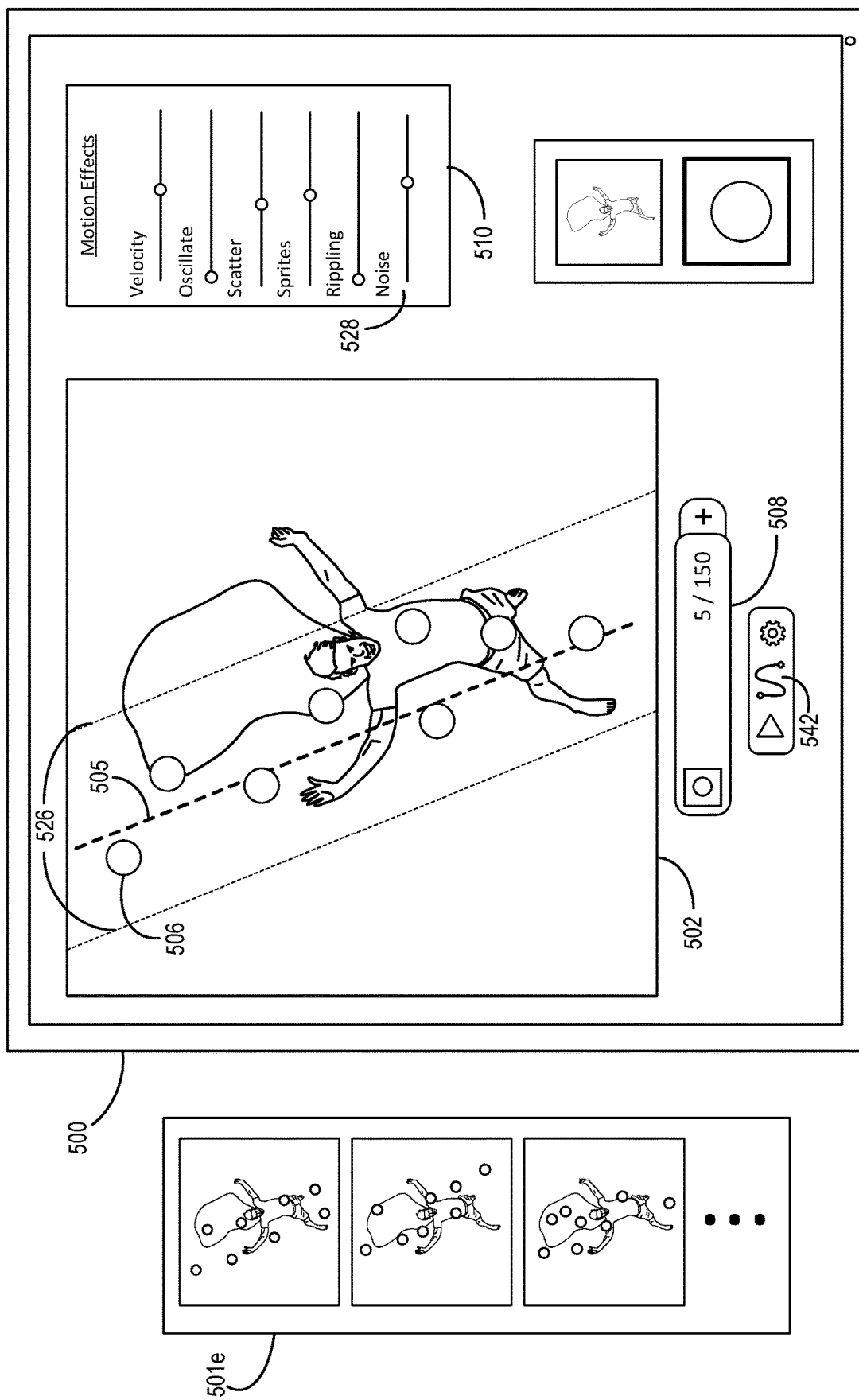

In one or more embodiments, the animation management system 102 also causes digital design objects to move randomly about an animation path. FIG. 5E illustrates the animation management system 102 implementing an adjustment to the randomization of movement about the animation path 505. More specifically, FIG. 5E illustrates a random path element 528 adjusted to include movement randomization in the digital animation.

Based on receiving the user input via the random path element 528, the animation management system 102 randomizes distance from the animation path 505 during the movement of the instances of the digital design object 506. To illustrate, the animation management system 102 generates a modified digital animation with randomized movement based on receiving user interaction at the random path element 528. As shown in FIG. 5E, the global animation frames 501e illustrate that the animation management system 102 modified the digital animation to portray random movement of the digital design objects directionally along the animation path 505 and around the animation path 505.

To illustrate, while in FIG. 5D, animation management system 102 caused the digital animation to portray instances of the digital design object 506 in a straight path parallel to animation path 505, based on the introduction of randomization in FIG. 5E, the animation management system 102 causes the digital animation to portray the instances of the digital design object 506 moving in randomized paths relative the animation path 505. That is, the animation management system 102 can generate the animation management system 102 to portray digital design objects moving in the general direction of the animation path 505 with varying distances (e.g., varying offsets) from the animation path 505 while cycling through the animation frames.

Additionally, in one or more embodiments, the animation management system 102 can generate the digital animation to portray instances of the digital design object 506 moving around the animation path according to a randomization function. A randomization function refers to a computer-implemented algorithm or other process to determine randomized paths for digital design objects. For example, a randomization algorithm can include a random number generator (that selects a random offset) or a random walk model that selects transitions to new positions from a current position (e.g., smooths a transition to a new position based on a probability of moving between positions). In some embodiments, the animation management system 102 utilizes the scatter threshold 526 to limit the potential positions for the randomized movement around the animation path 505. Accordingly, the animation management system 102 can implement random movement within the specified scatter threshold 526.

Figure 5F:
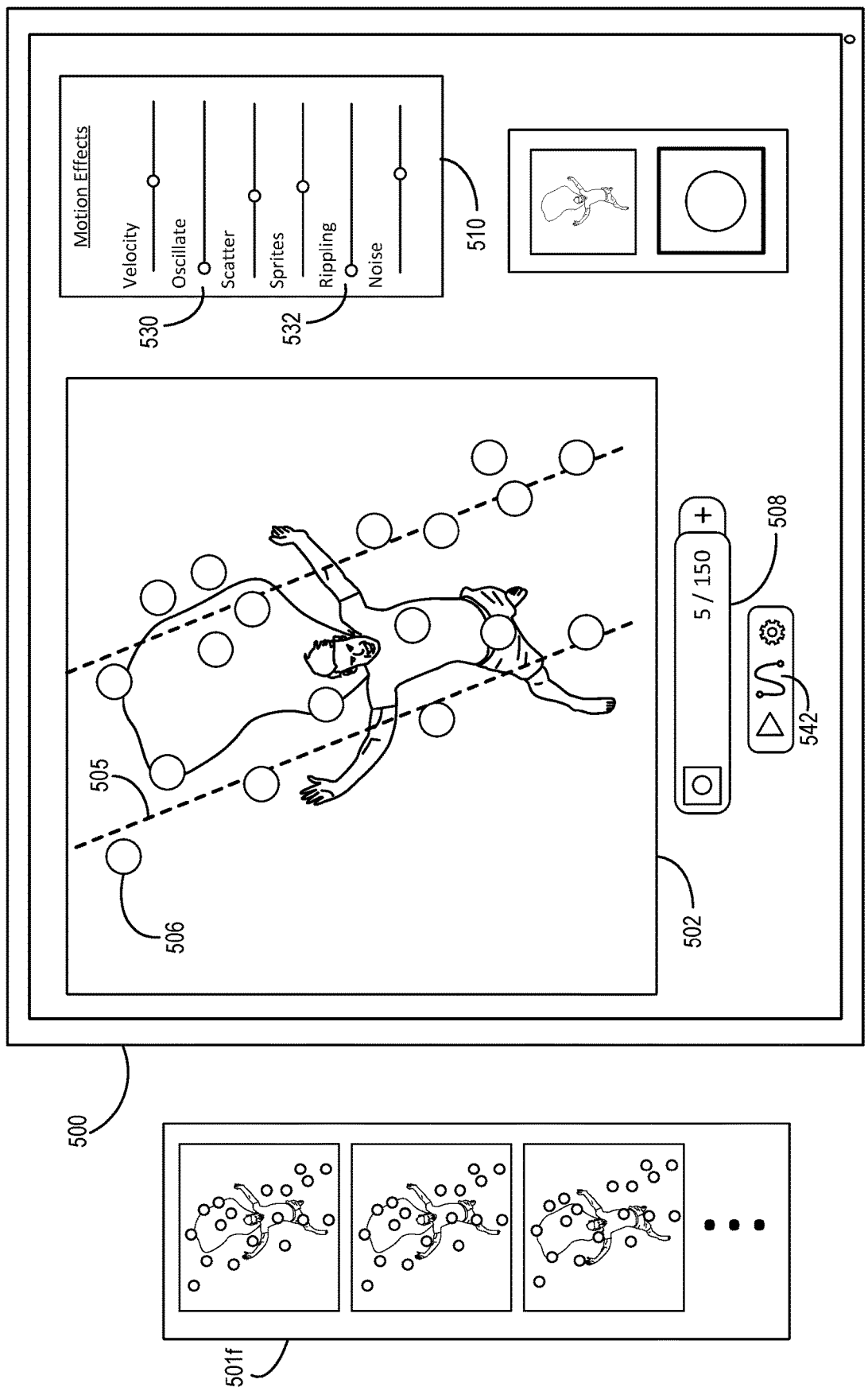

The animation management system 102 can also introduce additional animation paths. FIG. 5F shows the animation management system 102 generating an additional animation path 570. More specifically, the animation management system 102 receives user interaction via the animation canvas 502 indicating the additional animation path 570. Although FIG. 5F illustrates the animation path 570 as a duplicate of the animation path 505 (and its corresponding settings), the animation management system 102 can also generate an additional animation path with a different shape and unique animation settings.

In relation to FIG. 5F, the animation management system 102 generates the animation path 570 with the same motion settings as the animation path 505. Accordingly, the animation management system 102 updates the animation canvas and the corresponding digital animation to portray the additional animation path 570. More specifically, the animation management system 102 generates the digital animation to portray the instances of the digital design object 506 moving according to the animation path 570. In embodiments that include animation layers with multiple animation frames, the animation management system 102 can also cycle through the set of animation frames in moving instances along the animation paths 505 and 570.

Further, in some embodiments, the animation management system 102 can generate an additional animation path for digital design objects from additional animation layers. More specifically, as discussed above with regard to FIGS. 3A-3F, the animation management system 102 can generate an additional animation layer with additional digital design objects based on user interaction via the animation canvas. Further, the animation management system 102 can generate the same or additional animation paths for the additional animation layer. Thus, the animation management system 102 can portray digital design objects from multiple animation layers moving according to one or more animation paths while cycling through the set of animation frames corresponding to each animation layer.

As also shown in FIG. 5F, the motion effects settings menu 510 can include an oscillation element 530. In one or more embodiments, the animation management system 102 can generate a digital animation portraying digital design objects moving in a regular oscillation about an animation path. For instance, in response to the oscillation element 530, the animation management system 102 can move a digital design object along an animation path, but with offsets varying around the animation path according to a sinusoidal pattern with a modifiable amplitude, wavelength, and/or frequency. In some embodiments, the animation management system 102 determines the amplitude, wavelength and frequency of the oscillation based on user interaction with the oscillation element 530.

Additionally, as shown in FIG. 5F, the motion effects settings menu 510 can include a path animation size element 532. In one or more embodiments, based on receiving user interaction with the path animation size element 532, animation management system 102 generates a digital animation varying sizes of digital design objects. To illustrate, in some embodiments, the animation management system 102 generates the digital animation portraying a number of instances of the digital design object at various different sizes (with the magnitude of the size variations determined according to interaction with the path animation size element 532).

Figure 5G:
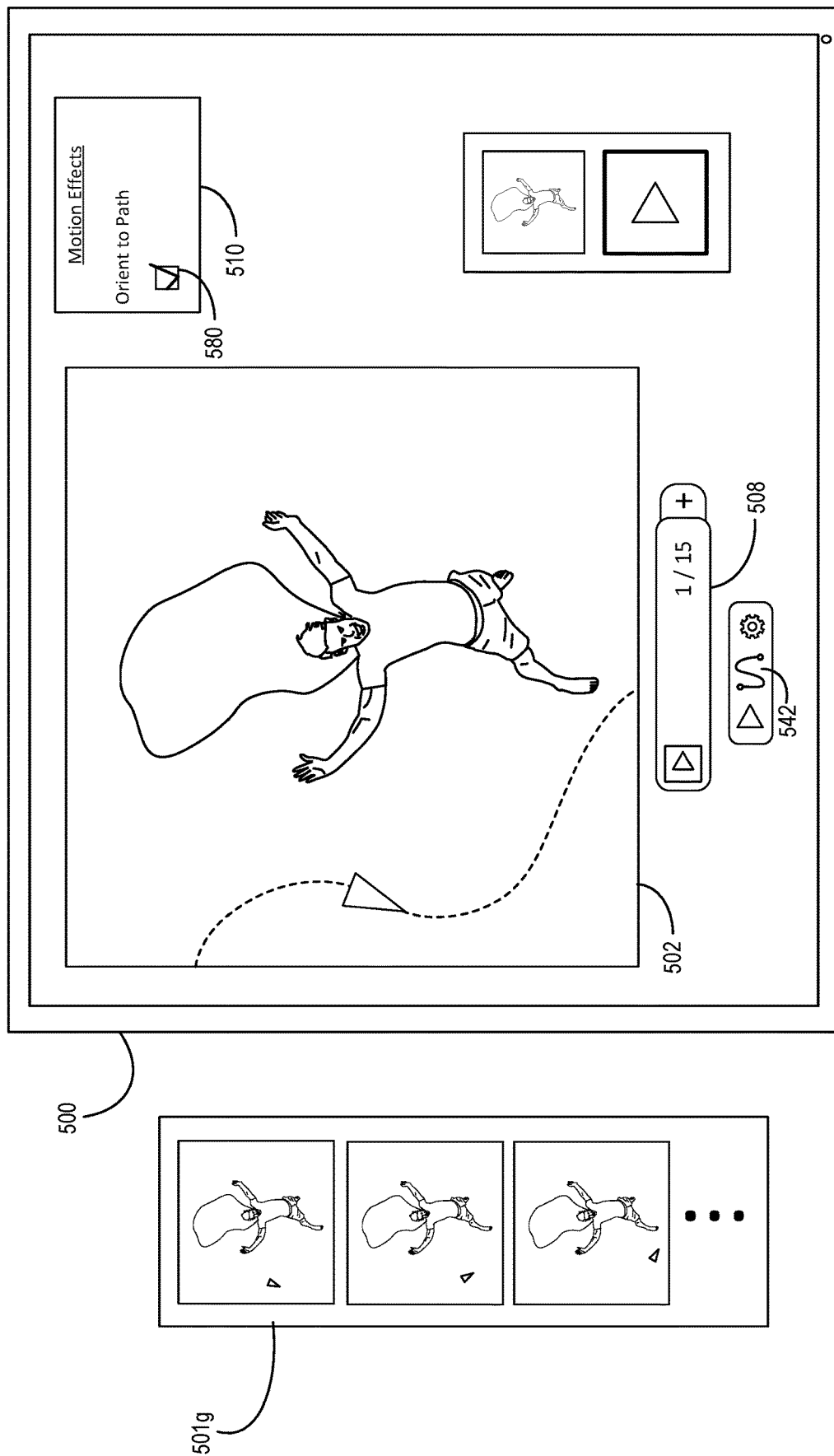

As mentioned, in some embodiments, the animation management system 102 also provides an option to vary the orientation of digital design objects along an animation path. For example, FIG. 5G illustrates the animation management system 102 implementing an animation path with a path orientation alignment element 580 selected. More specifically, in response to receiving user input via the path orientation alignment element 580, the animation management system 102 generates a digital animation portraying a digital design object moving according to the animation path and rotating to align to the animation path while cycling through the set of animation frames.

For example, as shown in the global animation frames 501g, the animation management system 102 portrays the triangle rotating to maintain its orientation relative to the animation path. That is, the animation management system 102 modifies the orientation of the digital design object relative to the animation frame based on the orientation of the animation path. For instance, the animation management system determines a line parallel or perpendicular to the animation path 505 and modifies the orientation of the digital design object as the line parallel or perpendicular to the animation path 505 varies. Thus, the animation management system 102 can orient the digital design object on the animation path as it moves according to the animation path.

Although FIGS. 5A-5G illustrate some embodiments with a single animation frame for an active animation layer and other embodiments with multiple animation frames for an active animation layer, it will be appreciated that the animation management system 102 can implement various animation effects utilizing either a single frame or while cycling through multiple frames of an animation layer. Thus, the animation management system 102 can utilize the random path element and generate a digital animation of one or more digital design objects of an animation layer moving directionally along the animation path and around the animation path according to a randomization function while cycling through the set of animation frames. Similarly, the animation management system 102 can cycle through a set of animation frames while implementing a scatter path animation modification, orientation path animation modification, or other path animation effects described herein.

Figure 6:
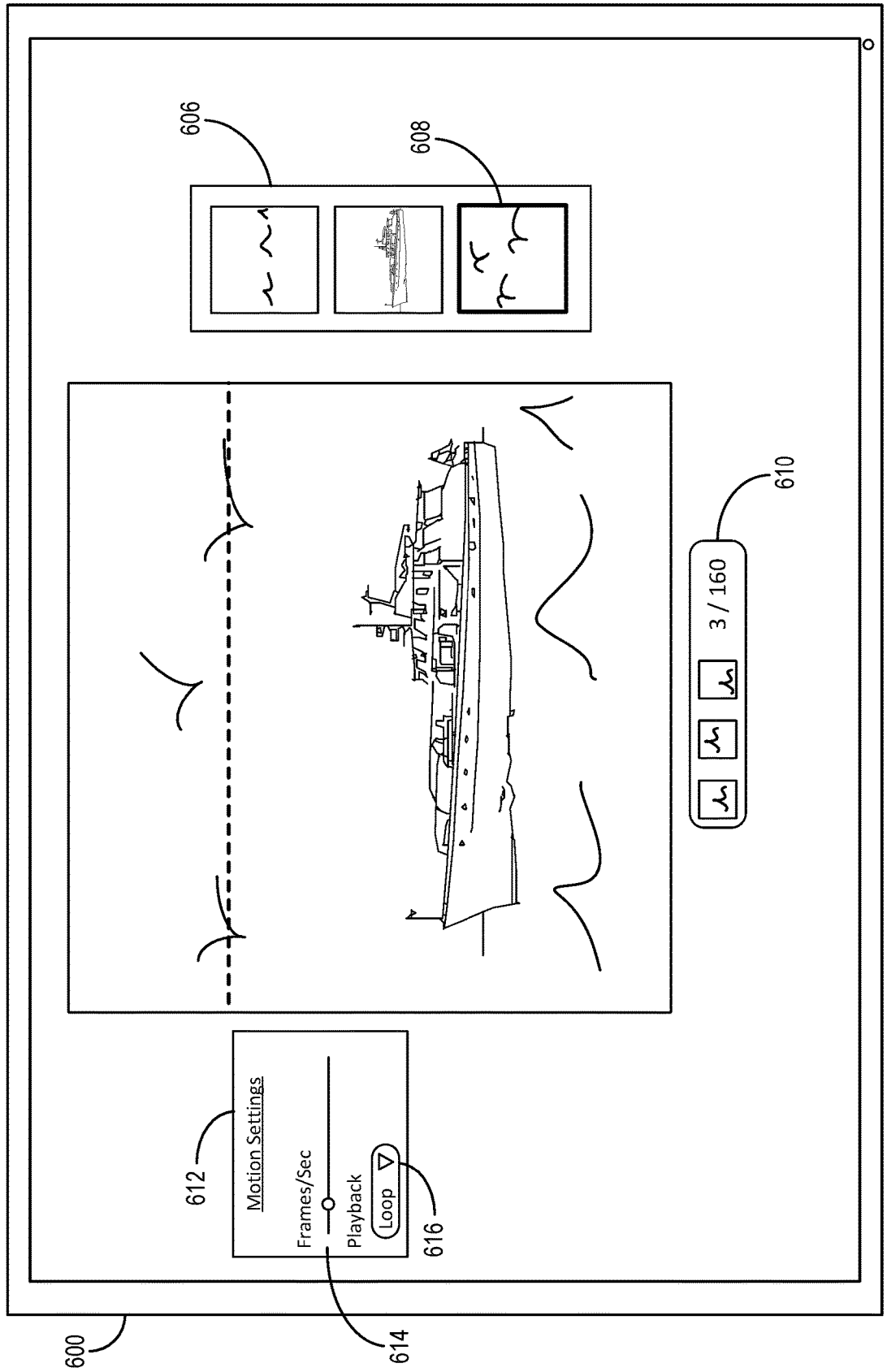
FIG. 6 illustrates an example graphical user interface including additional motion settings for animations of digital design objects on animation paths in accordance with one or more embodiments.

As mentioned above the animation management system 102 can also implement settings corresponding to motion of animation layers, including for animation paths. FIG. 6 provides additional detail for these motion settings. More specifically, FIG. 6 illustrates a computing device 600 including animation layer tiles 606, a selected animation layer tile 608, and a one-dimensional layer motion element 610. As shown in FIG. 6, the graphical user interface includes an animation of a ship on water and birds in the sky.

Additionally, the graphical user interface includes a motion settings graphical user interface element 612. The motion settings graphical user interface element 612 includes a framerate bar 614 and a playback options menu 616. As shown in FIG. 6, the motion settings graphical user interface element 612 is a box to the side of an animation canvas including various settings. However, it will be appreciated that in one or more embodiments, the motion settings graphical user interface element 612 can include a variety of types of settings and graphical user interface element types. For example, in one or more embodiments, the animation management system 102 can provide the motion settings graphical user interface element 612 as a break-out menu from the one-dimensional layer motion element 610.

As shown in FIG. 6, the framerate bar 614 is a slider graphical user interface element under the text "Fames/Sec." In one or more embodiments, the animation management system 102 can provide the framerate bar 614 as another of a variety of graphical user interface element types. For example, the animation management system 102 can provide the framerate bar 614 as a text box, a selectable menu, or another graphical user interface element type.

In one or more embodiments, based on receiving an indication of user interaction with the framerate bar 614, the animation management system 102 sets and/or modifies the framerate for a digital animation. In addition, or in the alternative, based on the user input, the animation management system 102 sets or adjusts a framerate corresponding to active animation layer and/or animation path. In one or more embodiments, the animation management system 102 can manage various framerate settings for different animation layers or components independently. Thus, by overlaying the animation layers to generate a digital animation, the animation management system 102 can generate a digital animation including different portions at different framerates.

As also shown in FIG. 6, the motion settings graphical user interface element 612 includes the playback options menu 616. As shown in FIG. 6, the playback options menu is a drop-down menu labelled "playback" with "loop" currently selected. However, it will be appreciated that in one or more embodiments, the animation management system 102 can provide the playback options menu 616 as a variety of user interface element types.

In one or more embodiments, the playback options menu 616 corresponds to settings for an animation path and/or various animation paths in an animation layer. To illustrate, the playback options menu 616 can include a "loop" option corresponding to repeatedly portraying one or more digital design objects moving in one direction according to the animation path while cycling through animation frames. For example, the animation management system 102 can cause the digital animation to portray the birds moving along the animation path to the right until they reach the rightmost point of the animation path, and then reappearing on the left side of the digital animation to move along the animation path to the right again.

Additionally, the playback options menu 616 can include a "boomerang" option corresponding to repeatedly portraying one or more digital design objects moving back and forth in either direction according to the animation path while cycling through animation frames. For example, the animation management system 102 can cause the digital animation to portray the birds moving along the animation path to the right until they reach the rightmost part of the animation path. Then, the animation management system 102 can cause the digital animation to portray the birds moving back along the animation path to the left until they reach the leftmost part of the animation path before repeating the cycle. The animation management system. 102 can apply different playback options to different animation layers (thus some objects will boomerang while others will loop).

Further, in some embodiments, the playback options menu 616 can include a limited iteration option corresponding to setting a limited number of times for the animation path loop or boomerang to repeat. For example, the animation management system 102 can receive and implement user input indicating that the birds should only move one time across the sky, starting at global animation frame 16. In another example, the animation management system 102 can receive and implement user input indicating that the birds should loop three times beginning at global animation frame 1.

Figure 7:
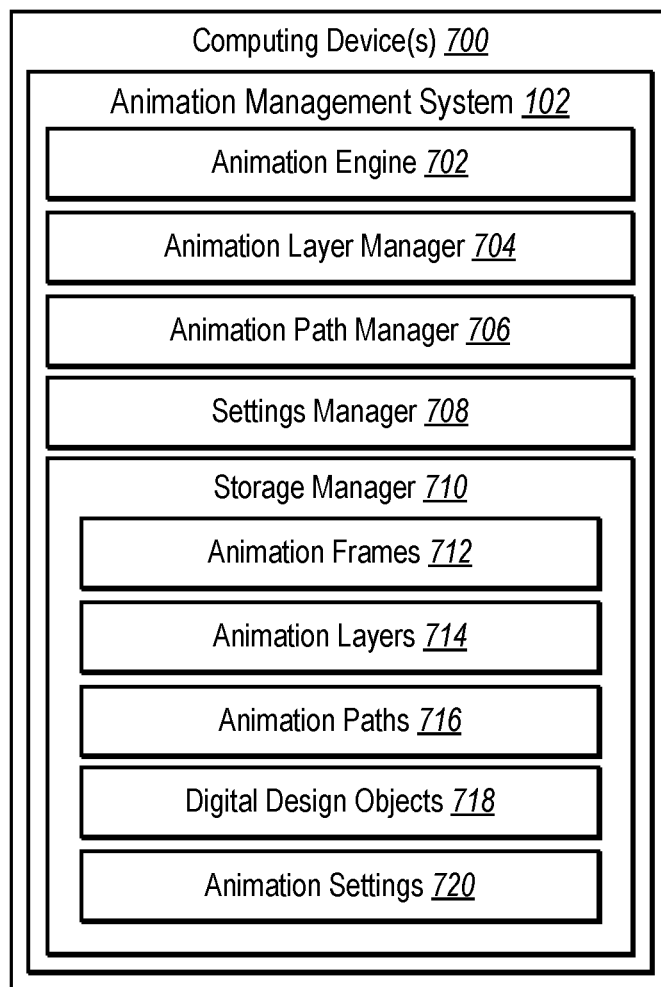
FIG. 7 a schematic diagram of an animation management system in accordance with one or more embodiments

Looking now to FIG. 7, additional detail will be provided regarding the components and capabilities of the animation management system 102. Specifically, FIG. 7 illustrates an example schematic diagram of the animation management system 102 on computing device(s) 700 (e.g., one or more of the client device 110 and/or the server(s) 104). To illustrate, the computing device(s) 700 include an animation engine 702, an animation layer manager 704, an animation path manager 706, a settings manager 708, and a storage manager 710.

As shown in FIG. 7, the computing device(s) 700 include the animation engine 702. In one or more embodiments, the animation engine generates, modifies, and provides digital animations based on user input. To illustrate, the animation engine 702 generates animation frames based on user interactions with an animation canvas, various settings graphical user interface elements, and/or a one-dimensional layer motion element. Additionally, in some embodiments, the animation engine 702 manages and implements modifications to digital animations (as discussed above). Further, the animation engine 702 can provide (i.e., playback) digital animations based on received user interactions.

Additionally, as shown in FIG. 7, the computing device(s) 700 include the animation layer manager 704. In one or more embodiments, the animation layer manager 704 generates, modifies, provides, and otherwise manages animation layers for digital animations. To illustrate, the animation layer manager 704 can manage generation of, settings for, and modifications to digital design objects on animation layers. Further, the animation layer manager 704 can manage animation frames for various animation layers independently. Additionally, in some embodiments, the animation layer manager aggregates animation layers to generate global frames for digital animations (as discussed above).

Further, as shown in FIG. 7, the computing device(s) 700 include the animation path manager 706. In one or more embodiments, the animation path manager 706 generates, modifies, and implements animation paths based on user interactions. To illustrate, the animation path manager 706 can identify when a user draws or otherwise selects an animation path and one or more digital design objects (e.g., in one or more frames) for the animation path. In one or more embodiments, the animation path manager 706 generates the animation path and places digital design objects on the animation bath based on this user input. Further, the animation path manager 706 can modify animation paths (e.g., shape of the animation path, digital design objects on the animation path) based on received user interaction with the animation canvas and/or various graphical user interface setting elements.

Also, as shown in FIG. 7, the computing device(s) 700 include the settings manager 708. In one or more embodiments, the settings manager 708 tracks and implements a variety of digital animation settings. For example, the settings manager 708 can determine and/or modify a number of frames per second for a digital animation and/or animation layers, a number of animation layers, display settings for the animation canvas, etc. In some embodiments, the animation engine 702 tracks one or more of these animation settings.

Further, as shown in FIG. 7, the computing device(s) 700 include the storage manager 710. The storage manager 710 (e.g., utilizing one or more memory devices) accesses and stores files, indicators, and other data for the animation management system. For example, as shown in FIG. 10, the storage manager 710 includes animation frames 712, animation layers 714, animation paths 716, digital design objects 718, and animation settings 720.

Each of the components 702-710 of the animation management system 102 can include software, hardware, or both. For example, the components 702-710 can include one or more instructions stored on a computer-readable storage medium and executable by processors of one or more computing devices, such as a client device or server device. When executed by the one or more processors, the computer-executable instructions of the animation management system 102 can cause the computing device(s) to perform the methods described herein. Alternatively, the components 702-710 can include hardware, such as a special-purpose processing device to perform a certain function or group of functions. Alternatively, the components 702-710 of the animation management system 102 can include a combination of computer-executable instructions and hardware.

Furthermore, the components 702-710 of the animation management system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-710 may be implemented as a stand-alone application, such as a desktop or mobile application. Furthermore, the components 702-710 may be implemented as one or more web-based applications hosted on a remote server. The components 702-710 may also be implemented in a suite of mobile device applications or "apps." To illustrate, the components 702-710 may be implemented in an application, including but not limited to ADOBE® CREATIVE CLOUD, such as ADOBE® ANIMATE, ADOBE® CHARACTER ANIMATOR, ADOBE® AFTER EFFECTS, ADOBE® ILLUSTRATOR, and ADOBE® PHOTOSHOP. "ADOBE", "ADOBE ANIMATE", "ADOBE CHARACTER ANIMATOR", "ADOBE AFTER EFFECTS", "ADOBE ILLUSTRATOR", and "ADOBE PHOTOSHOP" are either registered trademarks or trademarks of Adobe Inc. in the United States and/or other countries.

Figure 8:
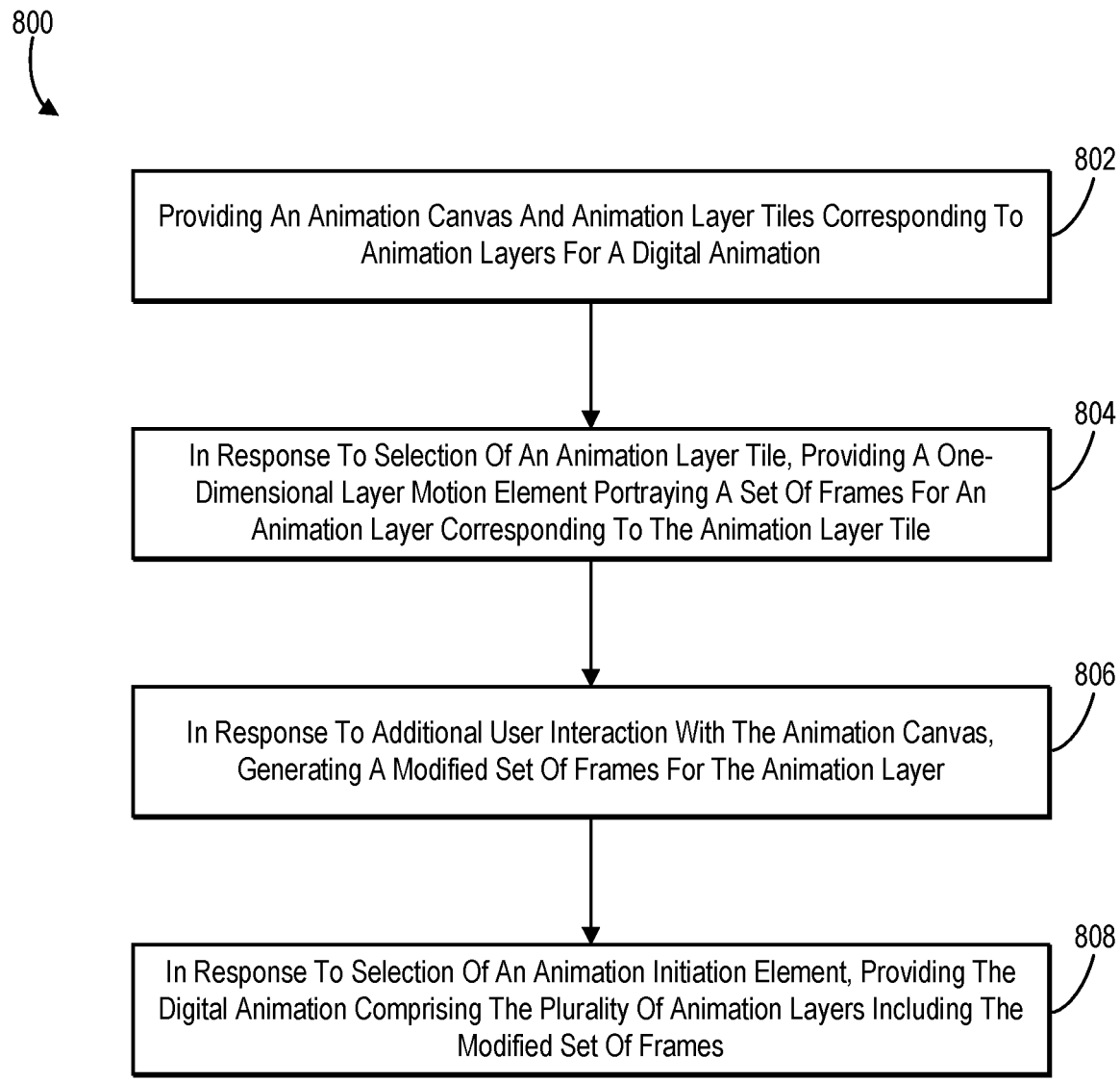
FIG. 8 illustrates a flowchart of a series of acts for generating a digital animation by modifying animation frames based on user interaction with a one-dimensional layer motion element in accordance with one or more embodiments.
Figure 9:
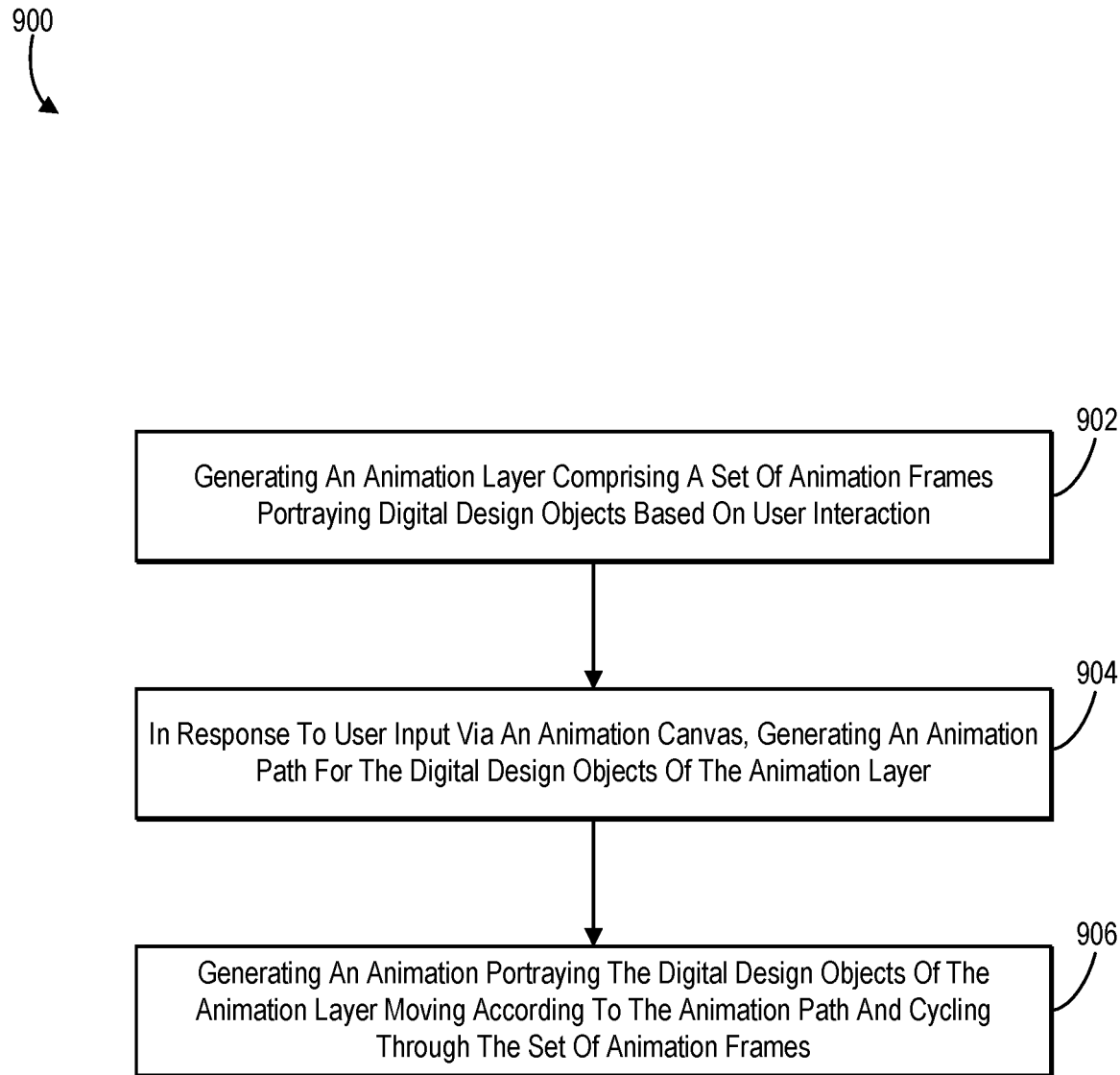
FIG. 9 illustrates a flowchart of a series of acts for generating an animation with animated digital design object(s) moving according to an animation path in accordance with one or more embodiments.

FIGS. 1-7, the corresponding text, and the examples provide a number of different methods, systems, devices, and non-transitory computer-readable media of the animation management system. In addition to the foregoing, one or more embodiments can also be described in terms of flowcharts comprising acts for accomplishing a particular result, as shown in FIGS. 8-9. FIGS. 8-9 may be performed with more or fewer acts. Further, the acts may be performed in differing orders. Additionally, the acts described herein may be repeated or performed in parallel with one another or parallel with different instances of the same or similar acts.

As mentioned, FIG. 8 illustrates a flowchart of a series of acts 800 for modifying and providing a digital animation by modifying animation frames based on user interaction with a one-dimensional layer motion element in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As shown in FIG. 8, the series of acts 800 includes an act 802 for providing an animation canvas and animation layer tiles corresponding to animation layers for a digital animation. In particular, the act 802 can include providing, for display via a user interface of a client device, an animation canvas and animation layer tiles corresponding to a plurality of animation layers for a digital animation. Additionally, the act 802 can include providing, for display via a user interface, an animation canvas and a one-dimensional layer motion element comprising a first set of frames of a first animation layer of the digital animation.

As shown in FIG. 8, the series of acts 800 includes an act 804 for, in response to selection of an animation layer tile, providing a one-dimensional layer motion element portraying a set of frames for an animation layer corresponding to the animation layer tile. In particular, the act 804 can include, in response to selection of an animation layer tile of the animation layer tiles: providing, for display via the user interface of the client device, a one-dimensional layer motion element portraying a set of frames for an animation layer corresponding to the animation layer tile.

Specifically, the act 804 can include, in response to the selection of the animation layer tile, providing for display a frame of the set of frames via the one-dimensional layer motion element and an animation timeline element, the animation timeline element comprising a current frame representation, corresponding to the frame, positioned within a sequence of global frame representations for the digital animation based on the plurality of animation layers. Additionally, the act 804 can include providing, for display via the user interface, the animation canvas, the one-dimensional layer motion element with the second set of frames of the second animation layer, and an animation timeline element comprising a current frame representation positioned within a sequence of global frame representations for the digital animation. The act 804 can also include wherein the additional user interactions with the animation canvas comprise user input of one or more additional animation frames generating the modified second set of frames for the second animation layer to comprise one or more additional animation frames, and providing, for display via the user interface, the animation canvas, the one-dimensional layer motion element with the modified second set of frames, and the animation timeline element comprising a modified sequence of global frame representations for the digital animation based on the one or more additional animation frames for the second animation layer.

Additionally, the act 804 can include perform operations comprising, in response to selection of an additional frame of the animation layer via the one-dimensional layer motion element, modifying the animation timeline element to display a different current frame representation, corresponding to the additional frame, positioned within the sequence of global frame representations. Further, the act 804 can include, in response to selection of a second animation layer tile of the animation layer tiles, providing for display via the user interface of the client device, the one-dimensional layer motion element portraying a second set of frames for a second animation layer corresponding to the second animation layer tile.

Additionally, the act 804 can include in response to selection of a second animation layer tile of the animation layer tiles, providing for display via the user interface of the client device the one-dimensional layer motion element portraying a second set of frames for a second animation layer corresponding to the second animation layer tile, and the animation timeline element comprising a second current frame representation positioned within the sequence of global frame representations for the digital animation based on the plurality of animation layers.

As shown in FIG. 8, the series of acts 800 includes an act 806 for, in response to additional user interaction with the animation canvas, generating a modified set of frames for the animation layer. In particular, the act 806 can include, in response to an additional user interaction with the animation canvas, generating a modified set of frames for the animation layer from the set of frames. Specifically, the act 806 can include wherein the additional user interaction with the animation canvas comprises user input of one or more additional animation frames, and further comprising instructions that, when executed by the at least one processor, cause the computing device to perform operations comprising generating the modified set of frames for the animation layer to comprise one or more additional animation frames, and providing the one-dimensional layer motion element portraying the modified set of frames comprising the one or more additional animation frames.

As shown in FIG. 8, the series of acts 800 includes an act 808 for, in response to selection of an animation initiation element, providing the digital animation comprising the plurality of animation layers including the modified set of frames. Accordingly, the act 808 can include in response to selection of an animation initiation element, providing, for display via the animation canvas, the digital animation comprising the plurality of animation layers including the modified set of frames. Specifically, the act 808 can include, in response to selection of the animation initiation element, providing for display via the user interface, the one-dimensional layer motion element cycling through the modified set of frames according to the digital animation.

Additionally, the act 808 can include providing, for display via the user interface, the one-dimensional layer motion element cycling through the modified second set of frames while providing, for display via the user interface, the animation canvas portraying the digital animation. Also, the act 808 can include providing for display via the user interface, the animation canvas portraying the digital animation together with the one-dimensional layer motion element cycling through the modified set of frames and the animation timeline element cycling through the sequence of global frame representations.

Additionally, in one or more embodiments, the act 808 can include wherein providing, for display via the animation canvas, the digital animation comprises iteratively looping the modified set of frames concurrently with an additional set of frames corresponding to an additional layer of the plurality of animation layers. Further, in one or more embodiments, the act 808 includes providing, for display via the user interface, the animation canvas portraying the digital animation by iteratively looping the first set of frames and the modified second set of frames, wherein a number of the first set of frames is different than a number of the second set of frames. In some embodiments, the act 808 also includes providing, for display via the user interface, the animation canvas portraying the digital animation comprising the plurality of animation layers including the modified set of frames.

Further, the act 808 can include in response to selection of a second animation layer of the digital animation, replacing the first set of frames of the first animation layer of the one-dimensional layer motion element with a second set of frames of the second animation layer, and in response to additional user interactions with the animation canvas, generating a modified second set of frames for the second animation layer from the second set of frames. The act 808 can also include in response to selection of an animation initiation element, providing, for display via the user interface, the animation canvas portraying the digital animation comprising the first set of frames of the first animation layer overlapping with the modified second set of frames of the second animation layer. Additionally, the act 808 can include, in response to selection of a third animation layer of the digital animation, replacing the second set of frames of the second animation layer of the one-dimensional layer motion element with a third set of frames of the third animation layer.

Turning to FIG. 9, FIG. 9 illustrates a flowchart of a series of acts 900 for generating an animation with animated digital design object(s) moving according to an animation path in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As shown in FIG. 9, the series of acts 900 includes an act 902 for generating an animation layer comprising a set of animation frames portraying digital design objects based on user interaction. In particular, the act 902 can include generating an animation layer comprising a set of animation frames portraying one or more digital design objects based on user interaction via an animation canvas of a user interface of a client device.

As shown in FIG. 9, the series of acts 900 includes an act 904 for in response to user input via an animation canvas, generating an animation path for the digital design objects of the animation layer. In particular, the act 904 can include in response to user input via the animation canvas, generating an animation path for the one or more digital design objects of the animation layer. Additionally, the act 904 can include, in response to receiving additional user input via the animation canvas, generating an additional animation path, and generating the animation further portraying a first instance of the one or more digital design objects of the animation layer moving according to the animation path and cycling through the set of animation frames and a second instance of the one or more digital design objects of the animation layer moving according to the additional animation path and cycling through the set of animation frames.

As shown in FIG. 9, the series of acts 900 includes an act 906 for generating an animation portraying the digital design objects of the animation layer moving according to the animation path and cycling through the set of animation frames. In particular, the act 906 can include generating an animation portraying the one or more digital design objects of the animation layer moving according to the animation path and cycling through the set of animation frames.

Specifically, the act 906 can include providing, for display via the user interface, a path animation modification element, receiving additional user input via the path animation modification element, and generating a modified animation portraying the one or more digital design objects of the animation layer based on the additional user input. Further, the act 906 can include in response to user interaction with a particle animation number element of the user interface, determining a number of instances of the digital design object, and generating an animation portraying the number of instances of the digital design object moving according to the animation path. Additionally, the act 906 can include wherein the path animation modification element comprises a particle animation number element, and further comprising, in response to receiving the additional user input via the particle animation number element, determining a number of instances of the one or more digital design objects of the animation layer, and generating the modified animation portraying the number of instances of the one or more digital design objects of the animation layer moving according to the animation path and cycling through the set of animation frames.

Further, the act 906 can include in response to receiving additional user input via a random path element of the user interface, generating the animation portraying the number of instances of the digital design object moving around the animation path according to a randomization function. Additionally, the act 906 can include, in response to receiving additional user input via a path orientation element, generating the animation portraying the number of instances of the digital design object moving along the animation path and rotating to align to the animation path. Also, the act 906 can include in response to receiving additional user input via a path animation size element, generating the animation further portraying the number of instances of the digital design object at different sizes.

The act 906 can also include wherein the path animation modification element comprises a random animation element, and further comprising, in response to receiving the additional user input via random path animation element, generating the modified animation portraying the one or more digital design objects of the animation layer moving directionally along the animation path and around the animation path according to a randomization function while cycling through the set of animation frames. Further, the act 906 can include wherein the path animation modification element comprises a path orientation alignment element, and further comprising, in response to receiving the additional user input via the path orientation alignment element, generating the modified animation portraying the one or more digital design objects moving according to the animation path and rotating to align to the animation path while cycling through the set of animation frames.

Additionally, the act 906 can include wherein the path animation modification element comprises a path velocity element, and further comprising in response to receiving the additional user input via the path velocity element, determining an animation velocity, and generating the modified animation portraying the one or more digital design objects of the animation layer according to the animation velocity while cycling through the set of animation frames. The act 906 can also include wherein the path animation modification element comprises a scatter element, and further comprising, in response to receiving the additional user input via the scatter element, generating the modified animation portraying the one or more digital design objects moving at a scattered offset relative to the animation path.

Additionally, the series of acts 900 can include generating an additional animation layer comprising an additional digital design object based on user interaction via the animation canvas, in response to receiving additional user input via the animation canvas, generating an additional animation path, and generating the animation portraying the one or more digital design objects of the animation layer moving according to the animation path and cycling through the set of animation frames and the additional digital design object moving according to the additional animation path. Further, the series of acts 900 can include, in response to receiving additional user input via the animation canvas, generating a modified set of animation frames for the animation layer from the set of animation frames, and generating a modified animation portraying the animation layer moving according to the animation path and cycling through the modified set of animation frames. Further, the series of acts 900 can include wherein the animation path corresponds to an animation layer, in response to receiving additional user input via the animation canvas, generating an additional animation path corresponding to an additional animation layer, and generating the animation further portraying an additional digital design object moving according to the additional animation path on the additional animation layer.

In one or more embodiments, the series of acts 900 also includes providing, for display via a user interface of a client device, a graphical user interface comprising an animation canvas and a plurality of animation layers of a digital image, receiving user input via the animation canvas selecting a first path for a first digital design object of a first animation layer of the plurality of animation layers, receiving user input via the animation canvas selecting a second path for a second digital design object of a second animation layer of the plurality of animation layers, and generating a digital animation portraying the first digital design object in the first animation layer moving according to the first path concurrently with the second digital design object in the second animation layer moving according to the second path.

Further, the series of acts 900 can include wherein the first animation layer comprises the first digital design object corresponding to a first frame and a second digital design object corresponding to a second frame and further comprising generating the digital animation further portraying the first digital design object and the second digital design object moving according the first path and cycling through the first frame and second frame. Additionally, the series of acts 900 can include in response to receiving additional user input via a path animation size element, determining animated sizes of the first digital design object, and generating the digital animation further portraying the first digital design object in the first animation layer moving according to the first path at the animated sizes.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

FIG. 10 illustrates a block diagram of an example computing device 1000 that may be configured to perform one or more of the processes described above. One will appreciate that one or more computing devices, such as the computing device 1000 may represent the computing devices described above (e.g., the server(s) 104, the client device 110, the computing device 300, the computing device 500, the computing device 600, the computing device(s) 700). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium comprising instructions that, when executed by at least one processor, cause a computing device to perform operations comprising:
   generating an animation layer comprising a set of animation frames portraying an animation of one or more digital design objects based on user interaction via an animation canvas of a user interface of a client device;
   in response to user input via the animation canvas, generating an animation path for the one or more digital design objects of the animation layer;

generating a global animation comprising:
- a first motion of the global animation portraying the one or more digital design objects of the animation layer moving according to the animation path; and
- a second motion of the global animation portraying repeated cycling through the set of animation frames portraying the animation of the one or more digital design objects;

receiving an additional user interaction via the animation canvas of the user interface modifying an animation frame of the set of animation frames portraying the animation of the one or more digital design objects; and based on the additional user interaction, automatically generating a modified global animation comprising:
- the first motion of the modified global animation portraying one or more modified digital design objects of the animation layer corresponding to the modified animation frame moving according to the animation path; and
- the second motion of the modified global animation portraying repeated cycling through the set of modified animation frames portraying a modified animation of the one or more modified digital design objects of the animation layer corresponding to the modified animation frame.

2. The non-transitory computer-readable medium of claim 1, further comprising instructions that cause a computing device to perform operations comprising:
- providing, for display via the user interface, a path animation modification element;
- receiving additional user input via the path animation modification element; and
- generating an additional modified animation portraying the one or more digital design objects of the animation layer based on the additional user input received via the path animation modification element.

3. The non-transitory computer-readable medium of claim 2, wherein the path animation modification element comprises a particle animation number element, and further comprising instructions that cause a computing device to perform operations comprising:
- in response to receiving the additional user input via the particle animation number element, determining a number of instances of the one or more digital design objects of the animation layer; and
- generating the additional modified animation portraying the number of instances of the one or more digital design objects of the animation layer moving according to the animation path and repeatedly cycling through the set of animation frames.

4. The non-transitory computer-readable medium of claim 2, wherein the path animation modification element comprises a random animation element, and further comprising instructions that cause a computing device to perform operations comprising, in response to receiving the additional user input via random path animation element, generating the additional modified animation portraying the one or more digital design objects of the animation layer moving directionally along the animation path and around the animation path according to a randomization function while cycling through the set of animation frames.

5. The non-transitory computer-readable medium of claim 2, wherein the path animation modification element comprises a path orientation alignment element, and further comprising instructions that cause a computing device to perform operations comprising:
- in response to receiving the additional user input via the path orientation alignment element, generating the additional modified animation portraying the one or more digital design objects moving according to the animation path and rotating to align to the animation path while cycling through the set of animation frames.

6. The non-transitory computer-readable medium of claim 2, wherein the path animation modification element comprises a path velocity element, and further comprising instructions that cause a computing device to perform operations comprising:
- in response to receiving the additional user input via the path velocity element, determining an animation velocity; and
- generating the additional modified animation portraying the one or more digital design objects of the animation layer according to the animation velocity while cycling through the set of animation frames.

7. The non-transitory computer-readable medium of claim 2, wherein the path animation modification element comprises a scatter element, and further comprising instructions that cause a computing device to perform operations comprising in response to receiving the additional user input via the scatter element, generating the additional modified animation portraying the one or more digital design objects moving at a scattered offset relative to the animation path.

8. The non-transitory computer-readable medium of claim 1, further comprising instructions that cause a computing device to perform operations comprising:
- in response to receiving additional user input via the animation canvas indicating an additional animation path, generating an additional animation path; and
- generating the animation further portraying a first instance of the one or more digital design objects of the animation layer moving according to the animation path and repeatedly cycling through the set of animation frames and a second instance of the one or more digital design objects of the animation layer moving according to the additional animation path and repeatedly cycling through the set of animation frames.

9. The non-transitory computer-readable medium of claim 1, further comprising instructions that cause a computing device to perform operations comprising:
- generating an additional animation layer comprising an additional digital design object based on further user interaction via the animation canvas;
- in response to receiving additional user input via the animation canvas, generating an additional animation path; and
- generating an additional modified global animation portraying the one or more digital design objects of the animation layer moving according to the animation path and repeatedly cycling through the set of animation frames and the additional digital design object moving according to the additional animation path.

10. The non-transitory computer-readable medium of claim 1, further comprising instructions that cause a computing device to perform operations comprising:
- in response to receiving the additional user interaction input via the animation canvas, generating a modified set of animation frames for the animation layer from the set of animation frames, wherein the modified set of animation frames comprises an additional digital design object corresponding to the additional user interaction; and
- generating the modified global animation portraying the additional digital design object.

11. A system comprising:
one or more memory devices comprising a digital design object; and
one or more processors configured to cause the system to:
in response to user input via an animation canvas of a user interface, generate an animation path for the digital design object;
in response to user interaction with a particle animation number element of the user interface, determining a number of instances of the digital design object;
determining a scatter threshold representing a maximum distance from the animation path based on a user selection via a scatter element of the user interface;
generating a distribution of scatter offsets based on a range of distances corresponding to the scatter threshold;
determining randomized distances from the animation path based on the distribution of scatter offsets; and
generate an animation portraying the number of instances of the digital design object moving parallel to the animation path at the randomized distances from the animation path within the scatter threshold.

12. The system of claim 11, wherein the one or more processors are further configured to cause the system to:
receive additional user input via the particle animation number element determining a modified number of instances of the digital design object; and
generate a modified animation portraying the modified number of instances of the digital design object moving according to the animation path.

13. The system of claim 11, wherein the one or more processors are further configured to cause the system to, in response to receiving additional user input via a random path element of the user interface, generate the animation portraying the number of instances of the digital design object moving around the animation path according to a randomization function.

14. The system of claim 11, wherein the one or more processors are further configured to cause the system to, in response to receiving additional user input via a path orientation element, generate the animation portraying the number of instances of the digital design object moving along the animation path and rotating to align to the animation path.

15. The system of claim 11, wherein the one or more processors are further configured to cause the system to, in response to receiving additional user input via a path animation size element, generate the animation further portraying the number of instances of the digital design object at different sizes.

16. The system of claim 11, wherein the one or more processors are further configured to cause the system to:
wherein the animation path corresponds to an animation layer, in response to receiving additional user input via the animation canvas, generating an additional animation path corresponding to an additional animation layer; and
generating the animation further portraying an additional digital design object moving according to the additional animation path on the additional animation layer.

17. A computer-implemented method comprising:
providing, for display via a user interface of a client device, a graphical user interface comprising an animation canvas and a plurality of animation layers of a digital image;
receiving user input via the animation canvas selecting a first path for a first set of animation frames of a first digital design object of a first animation layer of the plurality of animation layers;
receiving user input via the animation canvas selecting a second path for a second set of animation frames of a second digital design object of a second animation layer of the plurality of animation layers;
generating a digital animation portraying the first digital design object in the first animation layer moving according to the first path while repeatedly cycling through the first set of animation frames concurrently with the second digital design object in the second animation layer moving according to the second path while repeatedly cycling through the second set of animation frames;
receiving an additional user interaction via the animation canvas of the user interface modifying an animation frame of the set of animation frames of the first digital design object; and
based on the additional user interaction, automatically generating a modified global animation comprising:
a first motion of the modified global animation portraying a modified first digital design object corresponding to the modified animation frame moving according to the animation path; and
a second motion of the modified global animation portraying repeated cycling through the set of modified animation frames portraying a modified animation of the modified first digital design object corresponding to the modified animation frame.

18. The computer-implemented method of claim 17, further comprising:
in response to receiving additional user input via a particle number selection element, determining a number of additional instances of the first digital design object; and
generating the digital animation further portraying the number of additional instances of the first digital design object moving according to the first path.

19. The computer-implemented method of claim 17, wherein the first animation layer comprises the first digital design object corresponding to a first frame and the second digital design object corresponding to a second frame and further comprising generating the digital animation further portraying the first digital design object and the second digital design object moving according to the first path and cycling through the first frame and the second frame.

20. The computer-implemented method of claim 19, further comprising:
in response to receiving additional user input via a path animation size element, determining animated sizes of the first digital design object; and
generating the digital animation further portraying the first digital design object in the first animation layer moving according to the first path at the animated sizes.

* * * * *